(12) United States Patent
Tu et al.

(10) Patent No.: US 11,582,179 B2
(45) Date of Patent: Feb. 14, 2023

(54) INFORMATION SEARCH METHOD, TERMINAL, NETWORK DEVICE, AND SYSTEM

(71) Applicant: HUAWEI TECHNOLOGIES CO., LTD., Guangdong (CN)

(72) Inventors: Yongfeng Tu, Shenzhen (CN); Wenmei Gao, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 316 days.

(21) Appl. No.: 16/764,189

(22) PCT Filed: Nov. 15, 2017

(86) PCT No.: PCT/CN2017/111152
§ 371 (c)(1),
(2) Date: May 14, 2020

(87) PCT Pub. No.: WO2019/095156
PCT Pub. Date: May 23, 2019

(65) Prior Publication Data
US 2020/0293583 A1  Sep. 17, 2020

(51) Int. Cl.
*H04L 51/216* (2022.01)
*G06F 3/0488* (2022.01)
*G06F 16/953* (2019.01)

(52) U.S. Cl.
CPC .......... *H04L 51/216* (2022.05); *G06F 3/0488* (2013.01); *G06F 16/953* (2019.01)

(58) Field of Classification Search
CPC .. G06F 16/953; G06F 3/0488; G06F 16/2471; H04L 51/216; H04L 51/04;
(Continued)

(56) References Cited

U.S. PATENT DOCUMENTS 8,280,995 B2 * 10/2012 Miyamoto ............. G06Q 10/10
704/7
9,071,562 B2 * 6/2015 Chung .................. H04L 51/216
(Continued)

FOREIGN PATENT DOCUMENTS

CN    101119326 A    2/2008
CN    101610164 A    12/2009
(Continued)

OTHER PUBLICATIONS

Wikipedia, "Peer-to-peer" retrieved from: https://en.wikipedia.org/wiki/Peer-to-peer on Jul. 24, 2015, published on Apr. 28, 2014, total 14 pages.
(Continued)

*Primary Examiner* — Shen Shiau

(57) ABSTRACT

In an example information search method, if a first terminal performs a first search based on a first keyword, and does not obtain a result, the first terminal generates a request for performing a second search, and sends, to a network device, the request for performing the second search. The network device sends a second request to a second terminal. The second terminal performs the second search based on the first keyword, obtains a second search result, and sends the second search result to the first terminal. Through this technique, it can be effectively ensured that a user finds a search result corresponding to the first keyword, and that user privacy is also ensured.

13 Claims, 20 Drawing Sheets

(58) Field of Classification Search
CPC .. H04L 63/0823; H04L 67/10; H04W 12/069; H04W 4/12; H04W 12/08
See application file for complete search history.

(56) References Cited

U.S. PATENT DOCUMENTS

| | | | | |
|---|---|---|---|---|
| 9,473,432 | B2* | 10/2016 | Chung | H04L 51/216 |
| 10,200,319 | B2* | 2/2019 | Chung | G06F 16/3331 |
| 10,447,636 | B2* | 10/2019 | Yang | H04L 67/535 |
| 10,649,621 | B2* | 5/2020 | Kagan | H04L 67/025 |
| 11,005,789 | B1* | 5/2021 | Chung | H04L 51/216 |
| 2009/0119386 | A1* | 5/2009 | Busser | H04L 67/56 709/218 |
| 2009/0138576 | A1* | 5/2009 | Sekimoto | H04L 67/63 709/219 |
| 2011/0153746 | A1 | 6/2011 | Callanan et al. | |
| 2014/0164361 | A1* | 6/2014 | Chung | G06Q 10/107 707/722 |
| 2014/0164524 | A1* | 6/2014 | Chung | H04L 51/216 709/206 |
| 2016/0202943 | A1* | 7/2016 | Choi | G06F 3/04842 715/753 |
| 2017/0063747 | A1* | 3/2017 | Chung | G06F 16/90335 |
| 2017/0220551 | A1* | 8/2017 | Zha | G06F 9/451 |
| 2017/0300537 | A1 | 10/2017 | Kim et al. | |
| 2018/0121423 | A1* | 5/2018 | Orsini | G06Q 30/0217 |
| 2021/0026905 | A1* | 1/2021 | Huang | G06F 16/27 |
| 2021/0184996 | A1* | 6/2021 | Chung | H04L 67/104 |

FOREIGN PATENT DOCUMENTS

| | | | |
|---|---|---|---|
| CN | 103383698 | A | 11/2013 |
| CN | 103684980 | A | 3/2014 |
| CN | 103853815 | A | 6/2014 |
| CN | 104050219 | A | 9/2014 |
| CN | 104182488 | A | 12/2014 |
| CN | 105429846 | A | 3/2016 |
| CN | 105791100 | A | 7/2016 |
| CN | 105812231 | A | 7/2016 |
| CN | 106230703 | A | 12/2016 |
| CN | 106713127 | A | 5/2017 |
| CN | 107196852 | A | 9/2017 |
| EP | 1956777 | A2 | 8/2008 |
| WO | 2015131557 | A1 | 9/2015 |
| WO | WO-2015131557 | A1 * | 9/2015 ............. H04L 51/04 |

OTHER PUBLICATIONS

Supplementary European Search Report for European Application No. EP 17 93 2289 dated Aug. 18, 2020.

Office Action corresponding Chinese Application No. 021780096854.6 dated Oct. 27, 2020.

Anonymous,"Why does WeChat not support cloud storage?", retrieved from :https://www.zhihu.com/question/23959030, dated 2016, total 21 pages.

Chinese Notice of Allowance for Application No. 201780096854.6 dated May 10, 2022, 4 pages.

* cited by examiner

INFORMATION SEARCH METHOD, TERMINAL, NETWORK DEVICE, AND SYSTEM

CROSS-REFERENCE TO RELATED APPLICATIONS

This application is a national stage of International Application No. PCT/CN2017/111152, filed on Nov. 15, 2017, which is hereby incorporated by reference in its entirety.

TECHNICAL FIELD

This application relates to the field of communications technologies, and in particular, to information search.

BACKGROUND

The rise of mobile terminals brings a large amount of instant messaging (IM) software, so that people communicate more conveniently. In a process in which a user uses instant messaging, a client locally stores historical chat records by default, and the historical chat records can include historical records of point-to-point chats and historical records multi-party chats. However, a chat record in an existing instant messaging system (for example, WeChat) is not stored or backed up in a cloud. If the user locally deletes the chat record, the chat record cannot be restored. In many cases (for example, actively deleting, deleting by mistake, uninstalling an app and reinstalling the app, reinstalling a system, and replacing a mobile phone), the user may encounter this problem: Some previous chat records, links, or images that the user wants to search for cannot be obtained. However, due to problems such as user privacy, the chat record cannot be stored in the cloud or another network device. Therefore, once lost, a local chat record cannot be found.

SUMMARY

This application provides an information search method. When historical information of a terminal is deleted locally, a user may obtain corresponding historical information through an across-terminal search.

According to a first aspect, an embodiment of this application provides a first terminal. The first terminal includes: a detection module, where the detection module is configured to detect a first operation; a search module, where the search module is configured to perform a first search in response to the first operation, the first search is a search for a first keyword in a first record, the first record is stored on the first terminal, the first record is a record of a session in which a first user that logs on the first terminal and a second user that logs on a second terminal participate, and the first user is different from the second user; a display module, where the display module is configured to display a first search result obtained after the first search is performed and a first option, the first option is used to prompt to perform a second search, the second search is a search for the first keyword in a second record, and the second record is a record that is of the session and that is stored on the second terminal; the detection module is configured to detect a second operation performed on the option; and the display module is further configured to display a second search result obtained after the second search is performed. Therefore, a chat record does not need to be backed up in a network device or a cloud. When the chat record is lost, a user of a terminal can also effectively retrieve the chat record from another terminal that participated in the session, so that user privacy is better protected.

In a possible implementation, the first terminal includes a sending module and a receiving module. The sending module is configured to send a request for performing the second search, and the receiving module is configured to receive the second search result obtained after the second search is performed.

In another possible implementation, the display module is further configured to display indication information. The indication information is used to indicate that the second terminal enables a remote search function, and the remote search function allows the search for the first keyword in the second record. In this implementation, the user may decisively select an object, to initiate the second search to the object.

According to a second aspect, an embodiment of this application provides a first terminal. The first terminal includes: a detection module, where the detection module is configured to detect a first operation; a search module, where the search module is configured to perform a first search in response to the first operation, and the first search is a search for a first keyword in a first record; a sending module, where the sending module is configured to send a request for performing a second search, the second search is a search for the first keyword in a second record, the first record is stored on the first terminal, the first record is a record of a session in which a first user that logs on the first terminal and a second user that logs on a second terminal participate, the first user is different from the second user, and the second record is a record that is of the session and that is stored on the second terminal; and a display module, where the display module is configured to display a first search result obtained after the first search is performed and a second search result obtained after the second search is performed. In this implementation, a user of the first terminal may quickly and conveniently obtain the second search result.

In a possible implementation, the first terminal includes a sending module and a receiving module. The sending module is configured to send the request for performing the second search, and the receiving module is configured to receive the second search result obtained after the second search is performed.

In another possible implementation, the display module is further configured to display indication information. The indication information is used to indicate that the second terminal enables a remote search function, and the remote search function allows the search for the first keyword in the second record. In this implementation, the user may decisively select an object, to initiate the second search to the object.

According to a third aspect, an embodiment of this application provides a search method, applied to a first terminal. The method includes:

detecting, by the first terminal, a first operation;

performing a first search in response to the first operation, where the first search is a search for a first keyword in a first record, the first record is stored on the first terminal, the first record is a record of a session in which a first user that logs on the first terminal and a second user that logs on a second terminal participate, and the first user is different from the second user; displaying, by the first terminal, a first search result obtained after the first search is performed and a first option, where the first option is used to prompt to perform a second search, the second search is a search for the first keyword in a second record, and the second record is a record that is of the session and that is stored on the second terminal; detecting, by the first terminal, a second operation performed on the option; and displaying, by the first terminal, a second search result obtained after the second search is performed.

In a possible implementation, the method includes: after the detecting, by the first terminal, a second operation performed on the option, sending, by the first terminal in response to the second operation, a request for performing the second search; and receiving, by the first terminal, the second search result obtained after the second search is performed.

In another possible implementation, the method further includes: the sending, by the first terminal in response to the second operation, a request for performing the second search includes: sending, by the first terminal to a network device in response to the second operation, the request for performing the second search; and forwarding, by the network device, the request to the second terminal.

In another possible implementation, the method further includes: The network device has first indication information, the first indication information is used to indicate that the second terminal enables a remote search function, and the remote search function allows the search for the first keyword in the second record. In this manner, security of the second terminal can be effectively ensured.

In another possible implementation, the first terminal displays second indication information. The second indication information is used to indicate that the second terminal enables the remote search function, and the remote search function allows the search for the first keyword in the second record.

In another possible implementation, the method further includes: sending, by the first terminal, the request to the second terminal in response to the second operation.

In another possible implementation, the method further includes: The second search result includes the second search result and a context of the second search result. In this implementation, a complete result that the user wants to search for can be obtained.

In another possible implementation, the method further includes: The request for performing the second search includes a first identifier, a second identifier, and the first keyword. The first identifier is an identity of the first terminal, and the second identifier is an identity of the second terminal.

In another possible implementation, the method further includes: The second terminal includes a single terminal that has a session with the first terminal, one terminal in a same session group as the first terminal, or a plurality of terminals in a same session group as the first terminal.

In another possible implementation, the method further includes: The first operation or the second operation includes at least one of the following options: tapping a touchscreen of a terminal, double tapping the touchscreen of the terminal, or sliding on the touchscreen of the terminal and receiving voice input.

In another possible implementation, the method further includes: The historical information includes at least one of text information, a link, an image, or a video.

According to a fourth aspect, this application provides a search method, applied to a first terminal. The method includes: detecting, by the first terminal, a first operation; in response to the first operation, performing a first search and sending a request for performing a second search, where the first search is a search for a first keyword in a first record, the second search is a search for the first keyword in a second record, the first record is stored on the first terminal, the first record is a record of a session in which a first user that logs on the first terminal and a second user that logs on a second terminal participate, the first user is different from the second user, and the second record is a record that is of the session and that is stored on the second terminal; and displaying, by the first terminal, a first search result obtained after the first search is performed and a second search result obtained after the second search is performed. In this implementation, a user of the first terminal may perform a search more conveniently, so that efficiency is improved.

According to a fifth aspect, an embodiment of the present invention provides a first terminal. The first terminal includes one or more processors and one or more memories. The one or more memories store one or more computer programs, and the one or more computer programs include an instruction. When the instruction is executed by the one or more processors, the terminal is enabled to perform any method in the first aspect.

According to a sixth aspect, an embodiment of this application provides a search method. The method includes:

receiving, by a network device, a request that is sent by a first terminal and that is for performing a second search, where the second search is a search for a first keyword in a second record, the second record is stored on the second terminal, the second record is a record of a session in which a first user that logs on the first terminal and a second user that logs on the second terminal participate, and the first user is different from the second user, where the network device has first indication information, the first indication information is used to indicate that the second terminal enables a remote search function, and the remote search function allows the search for the first keyword in the second record; and forwarding, by the network device, the request to the second terminal.

In a possible implementation, the method includes: receiving, by the network device, a second search result that is sent by the second terminal and that is obtained after the second search is performed; and sending, by the network device, the second search result to the first terminal.

In another possible implementation, the method further includes: authorizing, by the network device, the request for performing the second search to generate authorization information; and sending, by the network device, the request and the authorization information to the second terminal.

In another possible implementation, the method further includes: The request includes a first identifier, a second identifier, or the first keyword. The first identifier is an identity of the first terminal, the second identifier is an identity of the second terminal, and the first keyword is included in the historical information.

In another possible implementation, the second terminal includes a single terminal that has a session with the first terminal.

In another possible implementation, the second terminal includes one or more terminals in a same session group as the first terminal.

In another possible implementation, the sending, by the network device, the second search result to the first terminal includes: comparing, by the network device, a first time with a second time at which the first terminal joins the session group, where the first time includes a time at which a third record including the second search result occurs; and sending, by the network device, the second search result to the first terminal when the second time is earlier than the first time.

In another possible implementation, the method further includes: The historical information includes at least one of text information, a link, an image, or a video.

In a possible implementation, the network device includes: the receiving module is further configured to receive the historical information from the network device, where the historical information is obtained by the network device from the second terminal.

In another possible implementation, the terminal further includes: the receiving module is further configured to directly receive the historical information from the second terminal.

According to a seventh aspect, an embodiment of this application provides a network device. The network device includes: a receiving module, where the receiving module is configured to receive a request that is sent by a first terminal and that is for performing a second search, the second search is a search for a first keyword in a second record, the second record is stored on the second terminal, the second record is a record of a session in which a first user that logs on the first terminal and a second user that logs on the second terminal participate, the first user is different from the second user, the network device has first indication information, the first indication information is used to indicate that the second terminal enables a remote search function, and the remote search function allows the search for the first keyword in the second record; and a sending module, where the sending module is configured to send the request to the second terminal.

In a possible implementation, the network device includes: the receiving module is further configured to receive a second search result that is sent by the second terminal and that is obtained after the second search is performed; and the sending module is further configured to send the second search result to the first terminal.

In another possible implementation, the network device further includes an authorization information generation module. The authorization information generation module is configured to authorize the request for performing the second search, to generate authorization information. The sending module is further configured to send the request for performing the second search and the authorization information to the second terminal.

In another possible implementation, the second terminal includes a single terminal that has a session with the first terminal.

In another possible implementation, the second terminal includes one or more terminals in a same session group as the first terminal.

In another possible implementation, the network device further includes a comparison module. The comparison module is configured to compare a first time with a second time at which the first terminal joins the session group. The first time includes a time at which a third record including the second search result occurs.

According to an eighth aspect, an embodiment of the present invention provides a network device. The network device includes one or more processors and one or more memories. The one or more memories store one or more computer programs, and the one or more computer programs include an instruction. When the instruction is executed by the one or more processors, the terminal is enabled to perform any method in the sixth aspect.

According to a ninth aspect, an embodiment of the present invention provides an information obtaining system, including the terminal in the first aspect and the second aspect and the network device in the seventh aspect and the eighth aspect.

According to a tenth aspect, an embodiment of the present invention provides a computer program product including an instruction. When the computer program product is run on an electronic device, the electronic device is enabled to perform the method described in the first aspect.

According to an eleventh aspect, an embodiment of the present invention provides a computer readable storage medium including an instruction. When the instruction is run on an electronic device, the electronic device is enabled to perform the method described in the first aspect.

According to a twelfth aspect, an embodiment of the present invention further provides a data processing system, including modules configured to perform the methods according to the first aspect.

Compared with the prior art, in the technical solutions of this application, a cross-terminal information search may be performed. This effectively ensures that a user can still obtain corresponding information after a record is lost. In addition, not all chat records need to be backed up in a network device, so that user privacy is effectively protected.

It is clearer and easier to understand the foregoing and other aspects of the present invention in descriptions of the following (plurality of) embodiments.

BRIEF DESCRIPTION OF DRAWINGS

FIG. 4(b)-1 and FIG. 4(b)-2 are a flowchart of an information obtaining method applied to a group session scenario according to an embodiment of the present invention;

DESCRIPTION OF EMBODIMENTS

The following describes embodiments of the present invention with reference to accompanying drawings.

The terms used in the embodiments of the present invention are merely for illustrating specific embodiments, and are not intended to limit the present invention. It should be understood that, the term "and/or" used herein indicates and includes any or all possible combinations of one or more associated listed items. The character "I" in this specification usually indicates an "or" relationship between the associated objects.

It should be understood that although terms "first", "second", "third", and the like may be used in the embodiments of the present invention to describe various messages, requests, and terminals, the messages, the requests, and the terminals are not limited by the terms. These terms are used only to distinguish between the messages, the requests, and the terminals. For example, without departing from the scope of the embodiments of the present invention, a first terminal may alternatively be referred to as a second terminal, and similarly, a second terminal may alternatively be referred to as a first terminal.

When a local session record on a terminal of a user A in an instant information system is lost or deleted, the user A cannot find a corresponding historical record. However, to ensure user privacy, the session record of the user A is not backed up in a cloud or a network device. Therefore, when the local session record is lost or deleted, the user A cannot find corresponding historical information any more.

An information search method provided in the embodiments of the present invention is used to search for information that is on a terminal. When the local session record on the terminal of the user A is lost or deleted, the user A initiates a request for searching on another terminal. The network device forwards the request to a terminal of a user B that is in a session with the user A, and the user B agrees to the request. A search is performed on the terminal of the user B, and corresponding historical information obtained through searching is sent to the terminal of the user A.

The terminal may be, for example, a mobile phone, a tablet, a laptop, a digital camera, a personal digital assistant (PDA), a navigation apparatus, a mobile internet apparatus (MID), or a wearable device.

Figure 1:
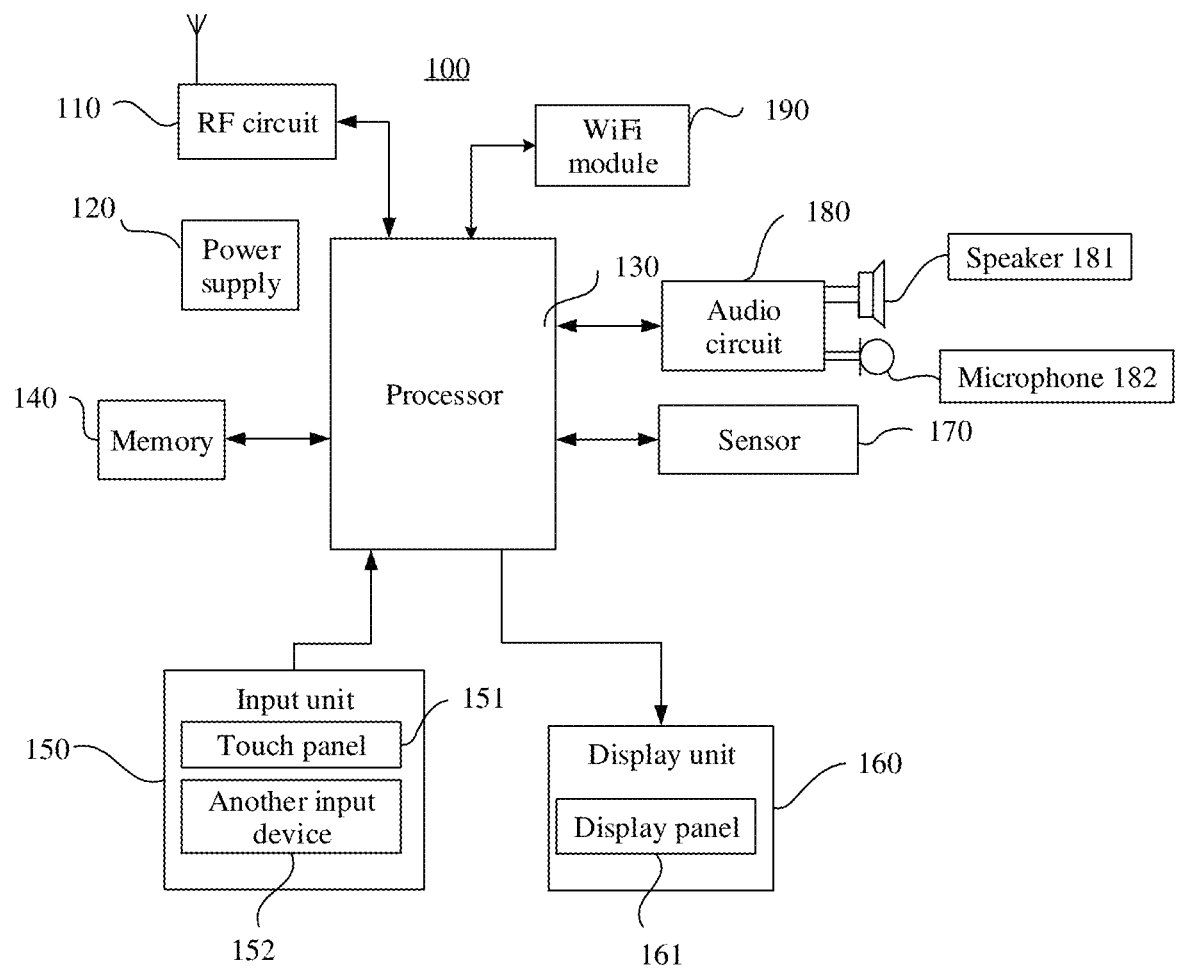
FIG. 1 is a schematic structural diagram of a part of a terminal device according to an embodiment of the present invention.

FIG. 1 is a structural block diagram of a part of a terminal according to an embodiment of the present invention. The terminal is described by using a mobile phone 100 as an example. Referring to FIG. 1, the mobile phone 100 includes components such as a radio frequency (RF) circuit 110, a power supply 120, a processor 130, a memory 140, an input unit 150, a display unit 160, a sensor 170, an audio circuit 180, and a wireless fidelity (WiFi) module 190. A person skilled in the art would understand that the structure of the mobile phone shown in FIG. 1 does not constitute a limitation on the mobile phone. The mobile phone may include more or fewer components than those shown in the figure, or may include a combination of some components, or may include different component arrangements.

The following describes in detail each component of the mobile phone 100 with reference to FIG. 1.

The RF circuit 110 may be configured to receive and send signals during receiving and sending of information or in a call process. For example, the RF circuit 110 may send downlink data received from a base station to the processor 130 for processing, and send uplink data to the base station. Generally, the RF circuit includes but is not limited to an RF chip, an antenna, at least one amplifier, a transceiver, a coupler, a low noise amplifier (LNA), a duplexer, a radio frequency switch, and the like. In addition, the RF circuit 110 may further perform wireless communication with a network and another device. Any communications standard or protocol may be used for the wireless communication, including but not limited to global system for mobile communications (GSM), general packet radio service (GPRS), code division multiple access (CDMA), wideband code division multiple address (WCDMA), long term evolution (LTE), an email, short message service (SMS), and the like.

The memory 140 may be configured to store a software program and a module. The processor 130 executes various function applications of the mobile phone 100 and performs data processing by running the software program and the module that are stored in the memory 140. The memory 140 may include a program storage area and a data storage area. The program storage area may store an operating system, an application program required by at least one function (such as a sound playing function and an image playing function), and the like. The data storage area may store data (such as audio data and a phone book) created based on use of the mobile phone 100, and the like. The memory 140 may include a high-speed random access memory, and may further include a nonvolatile memory, such as at least one magnetic disk storage device, a flash storage device, or another volatile solid-state storage device. The memory 140 may further store a knowledge base, a tag library, and/or an algorithm library.

The input unit 150 may be configured to receive an entered digit or entered character information, and generate a key signal input related to user setting and function control of the mobile phone 100. Specifically, the input unit 150 may include a touch control panel 151 and another input device 152. The touch control panel 151, also referred to as a touchscreen, may collect a touch operation of a user on or near the touch control panel 151 (such as an operation of the user on the touch control panel 151 or near the touch control panel 151 by using any suitable object or accessory such as a finger or a stylus), and drive a corresponding connection apparatus based on a preset program. Optionally, the touch control panel 151 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 130. Moreover, the touch controller can receive and execute a command sent by the processor 130. In addition, the touch control panel 151 may be implemented in any of a plurality of types, such as a resistive type, a capacitive type, an infrared type, and a surface acoustic wave type. The input unit 150 may include another input device 152 in addition to the touch control panel 151. Specifically, the other input device 152 may include but is not limited to one or more of a physical keyboard, a function key (such as a volume control key or an on/off key), a trackball, a mouse, and a joystick.

The display unit 160 may be configured to display information entered by the user or information provided for the user, and various menus of the mobile phone 100. The display unit 160 may include a display panel 161. Optionally, the display panel 161 may be configured in a form such as a liquid crystal display (LCD) or organic light-emitting diode (OLED). Further, the touch control panel 151 may cover the display panel 161. After detecting a touch operation on or near the touch control panel 151, the touch control panel 151 transfers the touch operation to the processor 130 to determine a touch event type. Subsequently, the processor 130 provides corresponding visual output on the display panel 161 based on the touch event type. Although, in FIG. 1, the touch control panel 151 and the display panel 161 are used as two separate parts to implement an input function and an output function of the mobile phone 100, in some embodiments, the touch control panel 151 and the display panel 161 may be integrated to implement the input function and the output function of the mobile phone 100.

The mobile phone 100 may further include at least one sensor 170, for example, a light sensor, a motion sensor, or another sensor. Specifically, the light sensor may include an ambient light sensor and a proximity sensor. The ambient light sensor may adjust brightness of the display panel 161 based on brightness of ambient light. The proximity sensor may turn off the display panel 161 and/or backlight when the mobile phone 100 approaches an ear. As a motion sensor, an accelerometer sensor may detect a value of an acceleration in each direction (three axes generally), may detect a value and a direction of gravity in a static mode, and may be applied to an application used for recognizing a mobile phone gesture (for example, screen switching between a landscape mode and a portrait mode, a related game, and magnetometer posture calibration), a function related to vibration recognition (for example, a pedometer or a knock), and the like. The mobile phone 100 may further be configured with another sensor, such as a gyroscope, a barometer, a hygrometer, a thermometer, or an infrared sensor. Details are not described herein again.

The audio circuit 180, a speaker 181, and a microphone 182 may provide an audio interface between the user and the mobile phone 100. The audio circuit 180 may convert received audio data into an electrical signal and transmit the electrical signal to the speaker 181, and the speaker 181 converts the electrical signal into a sound signal and outputs the sound signal. In addition, the microphone 182 converts a collected sound signal into an electrical signal, and the audio circuit 180 receives the electrical signal and converts the electrical signal into audio data, and outputs the audio data to the RF circuit 110 to send the audio data to, for example, another mobile phone, or outputs the audio data to the memory 140 for further processing.

WiFi is a short-range wireless transmission technology. The mobile phone 100 may enable, by using the WiFi module 190, the user to send and receive emails, browse a web page, access streaming media, and the like. WiFi provides wireless broadband internet access for the user. Although FIG. 1 shows the WiFi module 190, it may be understood that the WiFi module 190 is not a mandatory part of the mobile phone 100, and may be omitted according to a need without changing the essence of the present invention.

The processor 130 is a control center of the mobile phone 100, is connected to various parts of the entire mobile phone by using various interfaces and lines, and executes various functions of the mobile phone 100 and performs data processing by running or executing the software program and/or the module stored in the memory 140 and invoking data stored in the memory 140, so as to implement various mobile phone-based services. Optionally, the processor 130 may include one or more processing units. Preferably, an application processor and a modem processor may be integrated into the processor 130. The application processor mainly processes an operating system, a user interface, an application program, and the like. The modem processor mainly processes wireless communication. It may be understood that the modem processor may not be integrated into the processor 130.

In this embodiment of the present invention, the processor 130 may execute a program instruction stored in the memory 140, to perform a method shown in the following embodiments.

The mobile phone 100 further includes the power supply 120 (for example, a battery) configured to supply power for the components. Preferably, the power supply may be logically connected to the processor 130 by using a supply power management system. Therefore, functions such as management of charging, discharging, and power consumption are implemented by using the supply power management system.

Figure 2A:
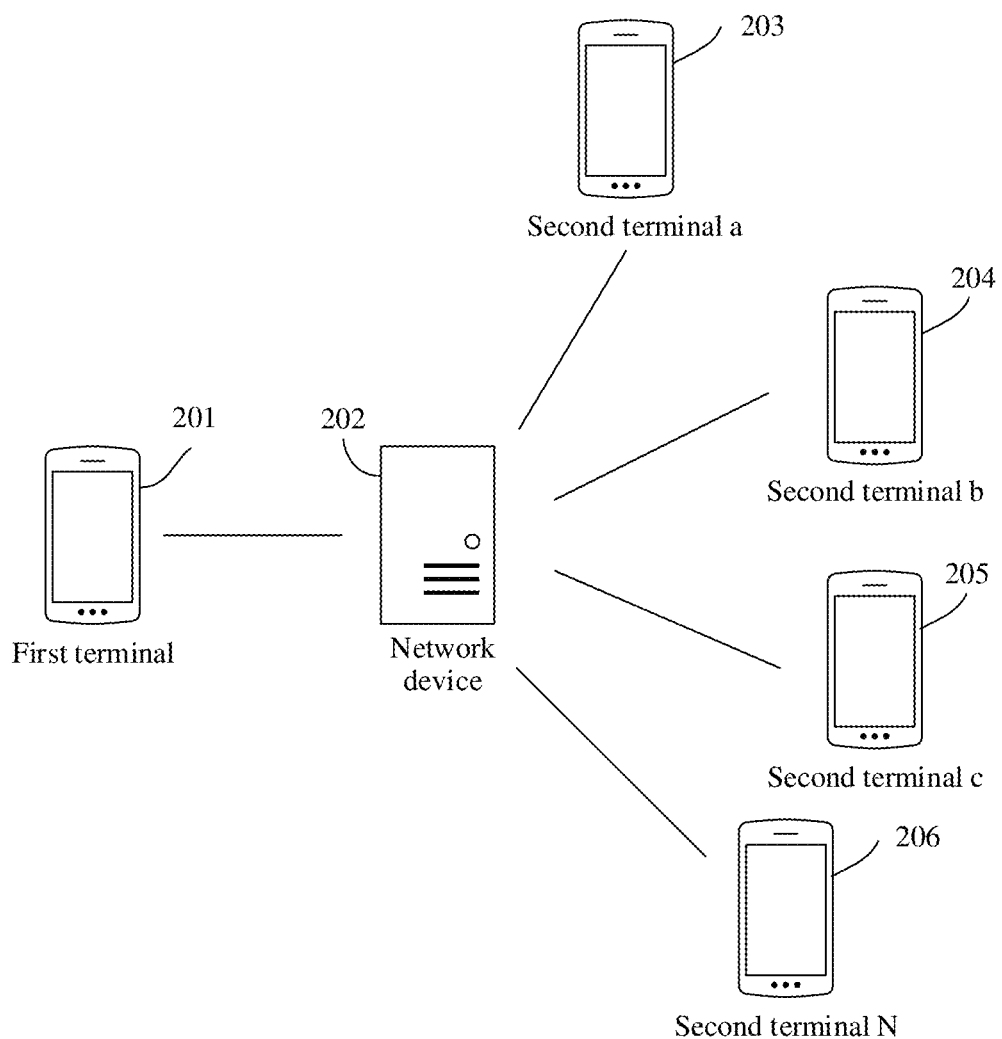
FIG. 2(a) is a schematic diagram of a remote search system according to an embodiment of the present invention.

As shown in FIG. 2(a), an embodiment of the present invention provides an information search system, including a first terminal 201, a network device 202, and a second terminal.

The second terminal may be one terminal or one or more terminals in a same session group as the first terminal 201. For example, the second terminal may include only a second terminal 203, or may include a plurality of terminals such as a second terminal a 203, a second terminal b 204, a second terminal c 205, and a second terminal n 206.

When detecting a first operation, the first terminal 201 performs a first search in response to the first operation. The first search is a search for a first keyword in a first record. The first record is stored on the first terminal 201, and the first record is a record of a session in which a first user that logs on the first terminal and a second user that logs on the second terminal participate. The first terminal displays a first search result obtained after the first search is performed, and displays a first option at the same time. When the first option is selected by the user, the first terminal 201 sends, to the second terminal or the network device, a request for performing a second search. The second search is a search for the first keyword in a second record, and the second record is a record that is of the session and that is stored on the second terminal.

Optionally, the network device 202 receives the request for performing the second search, and the network device has first indication information. The first indication information is used to indicate that the second terminal enables a remote search function. The remote search function allows the search for the first keyword in the second record. The network device, in some embodiments, adds network device authorization information in addition to the request for performing the second search, and sends, to the second terminal, the request for performing the second search and the authorization information. If it verifies that the authorization information is valid, the second terminal performs the second search locally. The second search is the search for the first keyword in the second record, and the second record is the record that is of the session and that is stored on the second terminal. Then the second terminal sends a second search result obtained from performing the second search to the network device which sends it to the first terminal. The first terminal displays the second search result.

Further, in some embodiments, after the second terminal enables the remote search function, the first terminal may display second indication information. The second indication information is used to indicate that the second terminal enables the remote search function, and the remote search function allows the search for the first keyword in the second record.

Figure 2B:
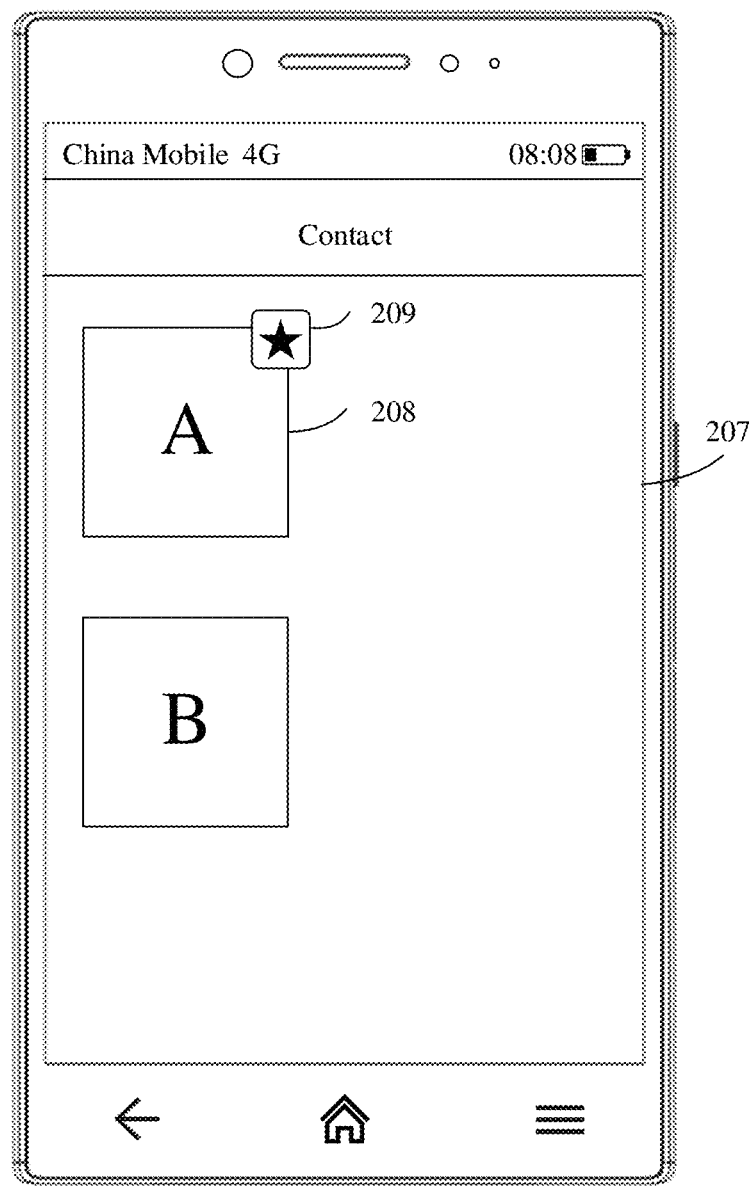
FIG. 2(b) is a schematic diagram of a graphical interface for displaying second indication information according to an embodiment of the present invention.

Specifically, as shown in FIG. 2(b), in some embodiments the terminal presents an interface 207. The interface 207 is a contact interface listing one or more friends or other contacts of the user of the terminal. The illustrated example contact interface 207 includes an icon 208 indicating a user A and an identifier 209. The identifier 209 indicates that the user A enables the remote search function.

When the user of the terminal does not find information locally, the user may conveniently learn, by viewing the contact interface, which other user enables the remote search function, and the user may directly initiate, to the other user, the request for performing the second search.

Figure 3A:
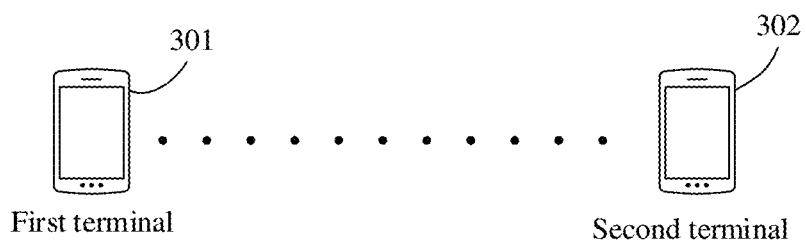
FIG. 3(a) is a schematic diagram of a point-to-point session scenario according to an embodiment of the present invention.
Figure 3B:
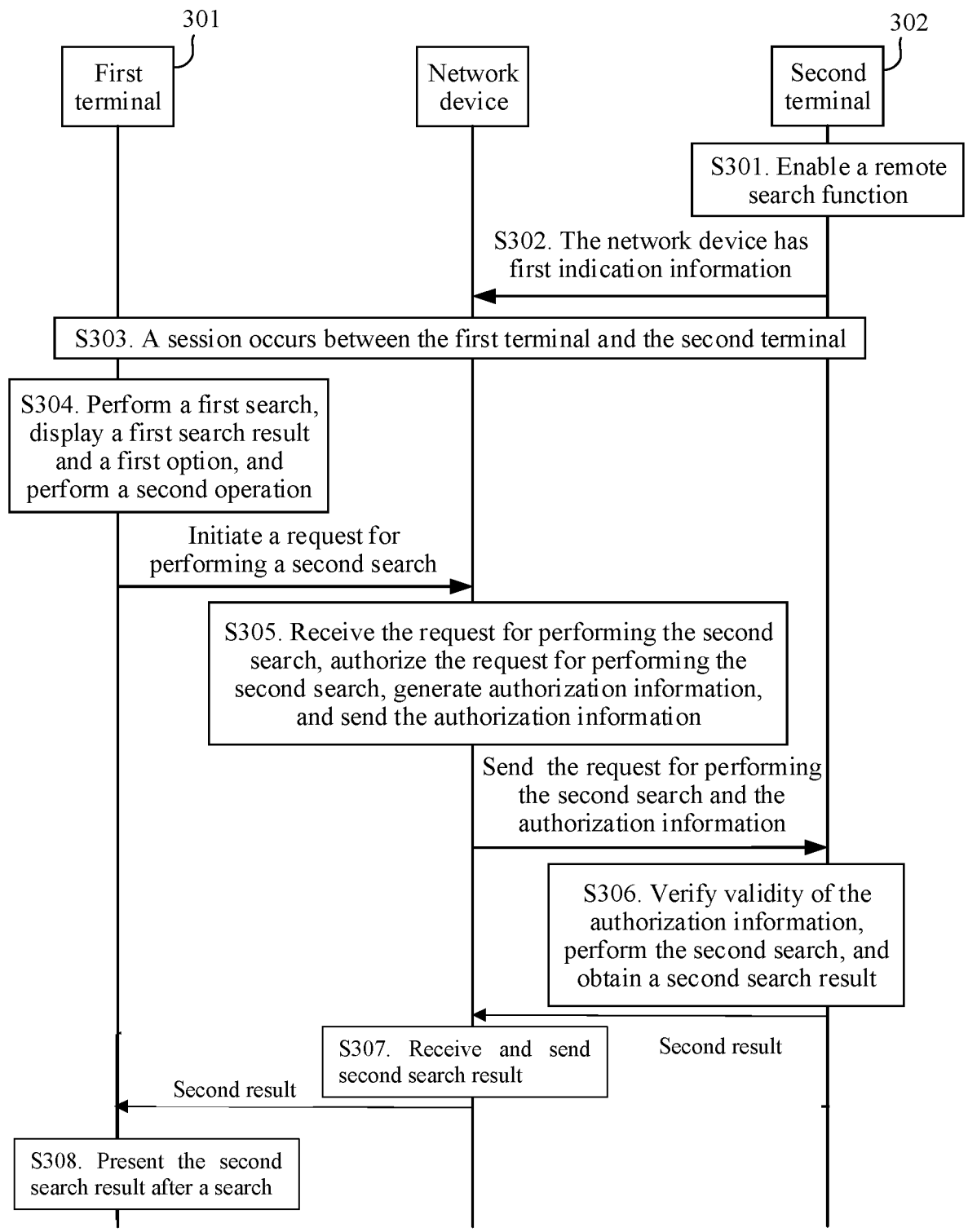
FIG. 3(b) is a flowchart of an information obtaining method applied to a point-to-point dialog scenario according to an embodiment of the present invention.

As shown in FIG. 3(a) and FIG. 3(b), some embodiments of the present invention provide a historical information search method applied to a point-to-point dialog scenario. The point-to-point dialog scenario is shown in FIG. 3(a), and includes a first terminal 301 and a second terminal 302 having a dialog with the first terminal.

FIG. 3(b) is a flowchart of an information obtaining method applied to the point-to-point dialog scenario. The method includes the following steps:

S301. The second terminal 302 enables a remote search function.

S302. A network device receives first indication information from the second terminal 302.

S303. A dialog occurs between the first terminal 301 and the second terminal 302.

S304. The first terminal performs a first search, displays a first search result obtained from the first search and a first option, performs a second operation, and initiates a request for performing the second search.

S305. The network device receives the request for performing the second search, authorizes the request for performing the second search, generates authorization information, and sends the authorization information to the second terminal.

S306. The second terminal verifies validity of the authorization information, performs the second search, and obtains a second search result from performing the second search.

S307. The second search result is received by the network device and forwarded to the first terminal.

S308. The first terminal obtains historical information from the second search results, and locally presents (e.g. displays) the historical information to the user.

In step S301, the remote search function across terminals is enabled on the second terminal.

In step S302, the first indication information from the second terminal is used to indicate that the second terminal enables the remote search function across the terminals.

Figure 3C:
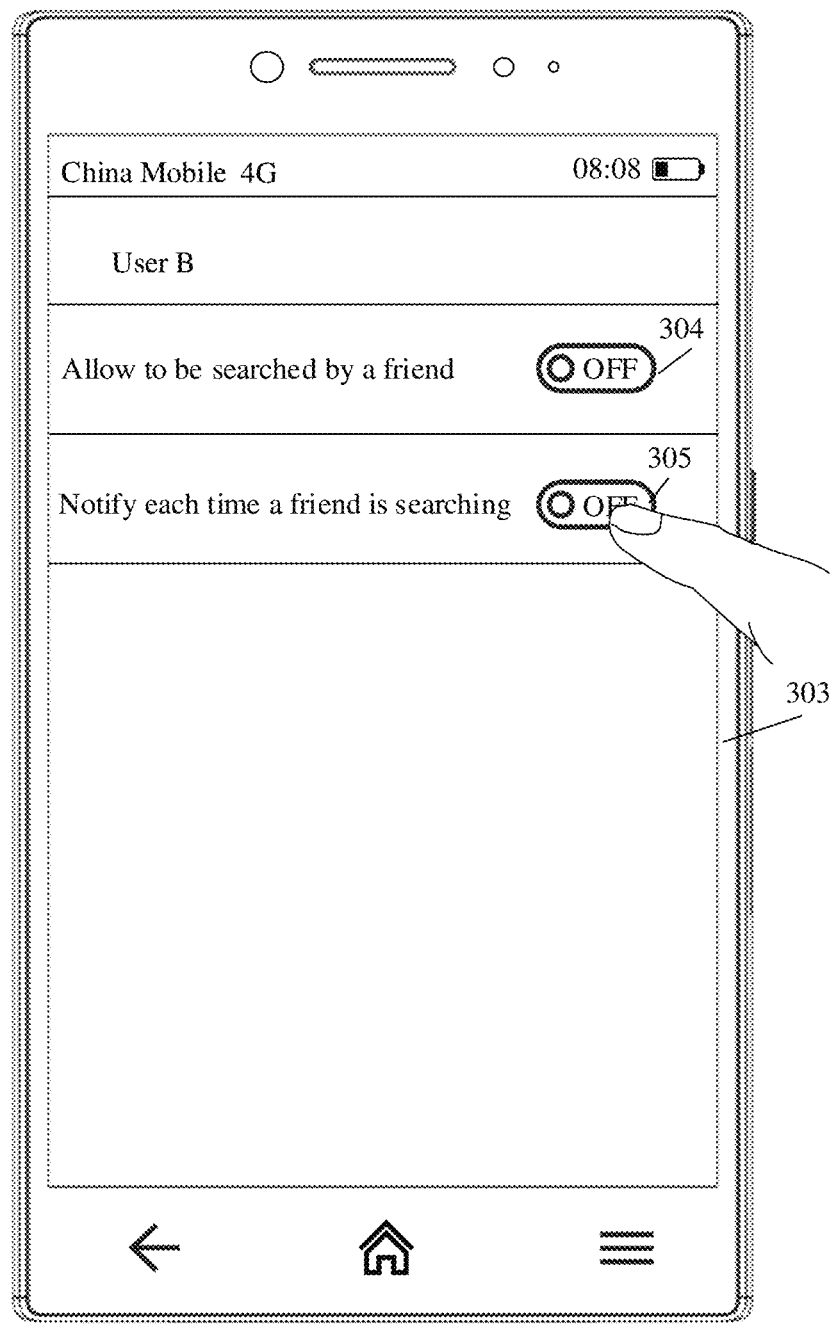
FIG. 3(c) is a schematic diagram of a graphical interface in which a remote search function is enabled according to an embodiment of the present invention.

Specifically, as shown in FIG. 3(c), the second terminal displays an interface 303, and the interface 303 includes an option 304 and an option 305. The option 304 is a control interface for a user of the second terminal to enable a function of allowing a user of the first terminal to request performing a remote search on the second terminal. The option 305 is used to enable a function of requesting the user of the second terminal to perform verification each time the user of the first terminal requests a remote search to be performed on the second terminal.

In step S303, the dialog or session between the first and second terminals includes sending SMS messages to each other or sending messages by using instant messaging software such as WeChat or QQ. Specifically, the user of the second terminal and the user of the first terminal are friends as identified by the application providing for the dialog. If the dialog is a temporary session, in some embodiments, the user of the second terminal and the user of the first terminal are not friends. In some embodiments, friend verification is required to be performed before performing of the second search is initiated in response to the request for performing the second search.

In step S304, the request for performing the second search includes a first identifier, a second identifier, and a first keyword. The first identifier is an identity of the first terminal, the second identifier is an identity of the second terminal, and the first keyword is a search string. In some embodiments, the first keyword is included in a search result from the first search and/or the second search.

The first terminal first performs the first search based on the first keyword and obtains a first search result. If the first search result includes the first keyword, the first terminal presents the search result and displays the first option at the same time. The first option is used, when it is selected by the user of the first terminal, to initiate the request for performing the second search on the second terminal. If the first search result does not include the first keyword, the user of the first terminal performs the second operation on the first option to select it, and, in response, the first terminal initiates the request for performing the second search. The request for performing the second search includes the identifier of the first terminal, the identifier of the second terminal that is in a session with the first terminal, and the first keyword that needs to be searched for by the second terminal. Specifically, when the first terminal needs to search for historical information including a first keyword "A", if the first terminal does not find the historical information as a result of performing the first search, the first terminal initiates the request for performing the second search, and the second terminal performs the second search.

Further, in some embodiments, the foregoing search process may be implemented in software, and determining the search manner may be performed in a specific dialog interface, or may be performed on a home screen.

Figure 3D:
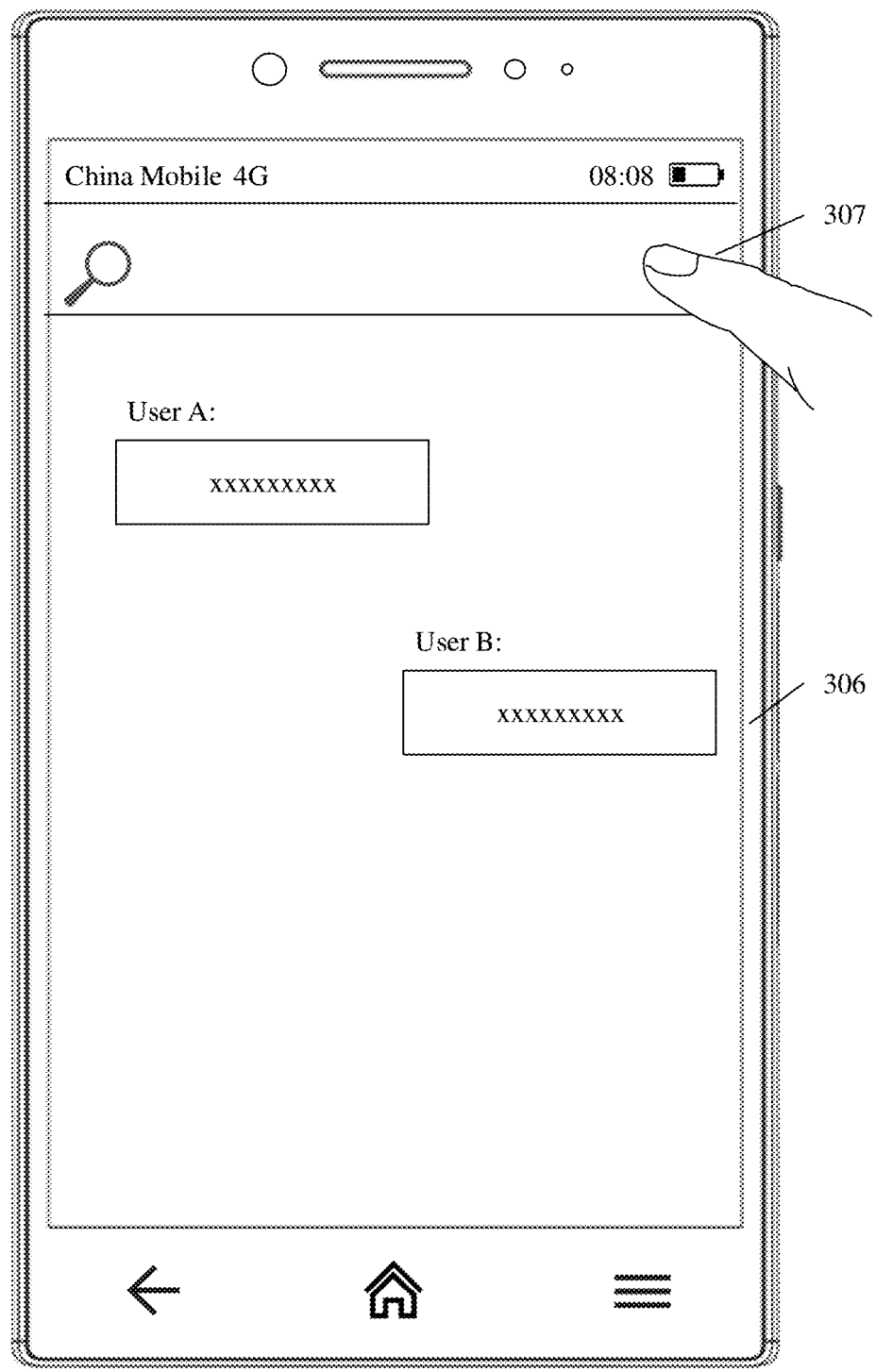
FIG. 3(d) is a schematic diagram of a graphical interface in which information is searched at a chat window according to an embodiment of the present invention.

Specifically, in some embodiments, as shown in FIG. 3(d), the terminal presents an interface 306. The interface 306 is a user session interface and includes a search box 307. When a user needs to search for information, the user taps the search box 307.

Figure 3E:
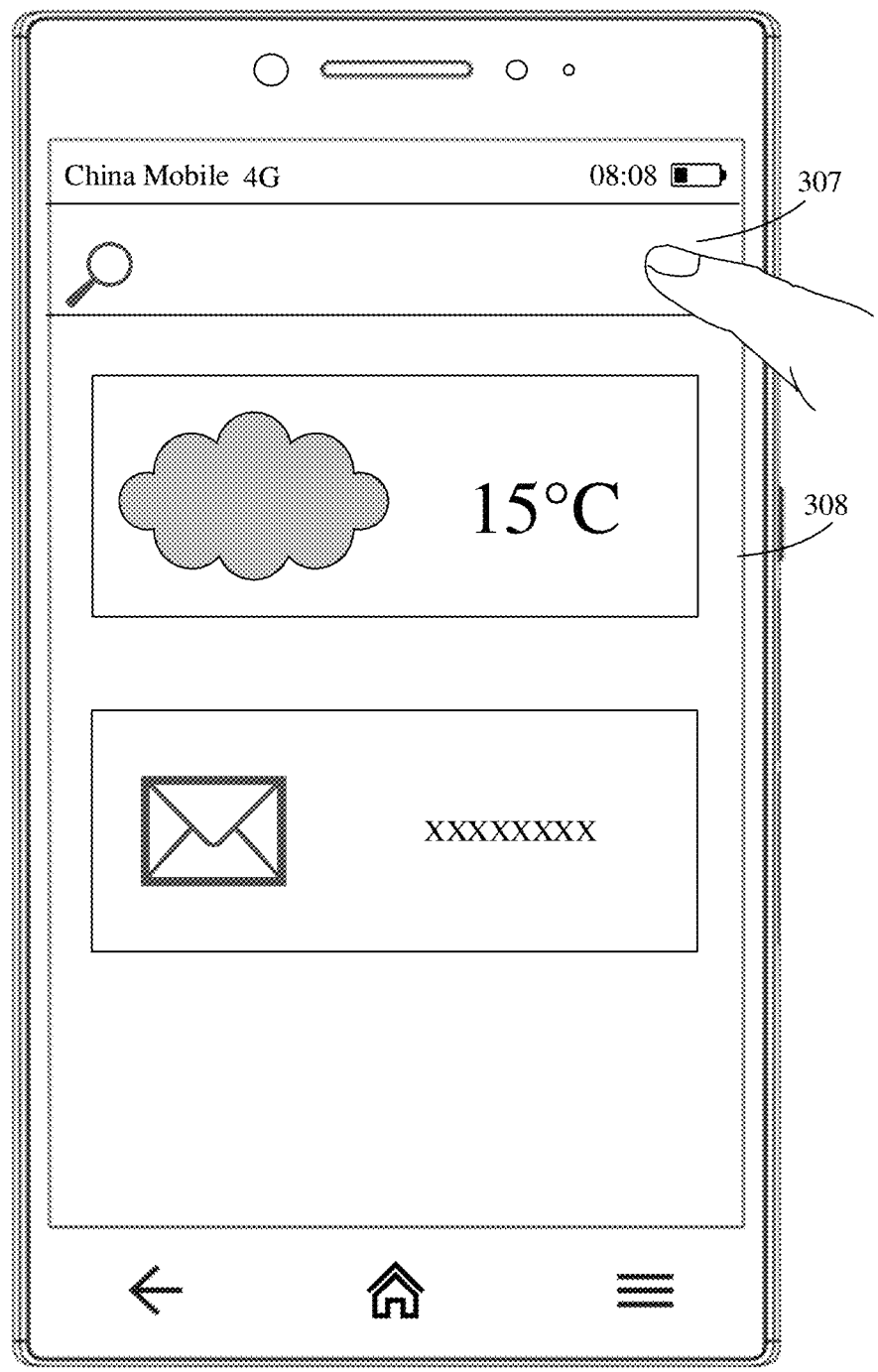
FIG. 3(e) is a schematic diagram of a graphical interface in which information is searched on a home screen according to an embodiment of the present invention.

As shown in FIG. 3(e), the terminal presents an interface 308. The interface 308 is a home screen of the terminal, and the interface 308 includes a search box 307. The user may tap the search box 307 to perform a search.

Figure 3F:
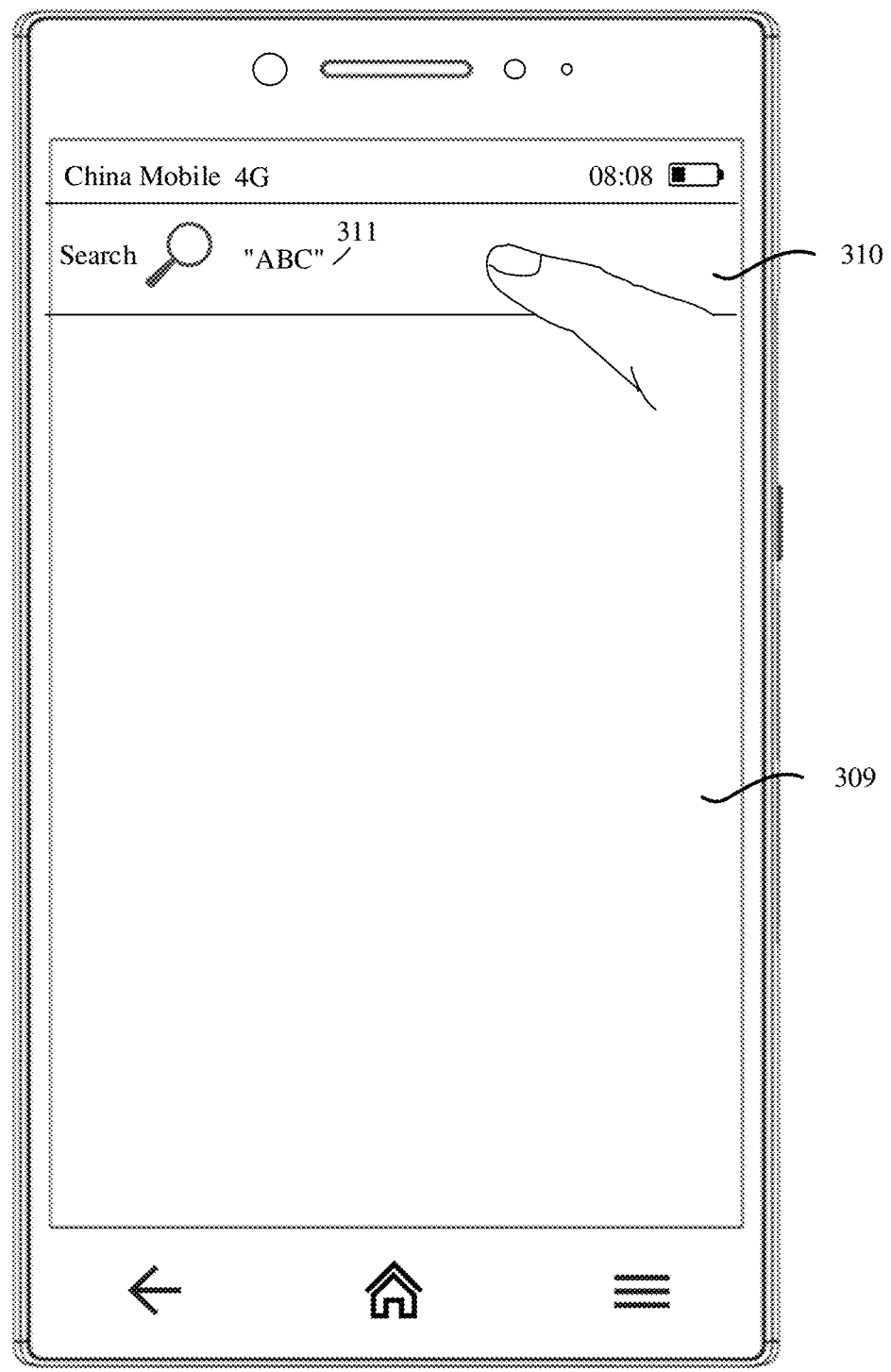
FIG. 3(f) is a schematic diagram of a graphical interface in which a first keyword is entered according to an embodiment of the present invention.
Figure 3G:
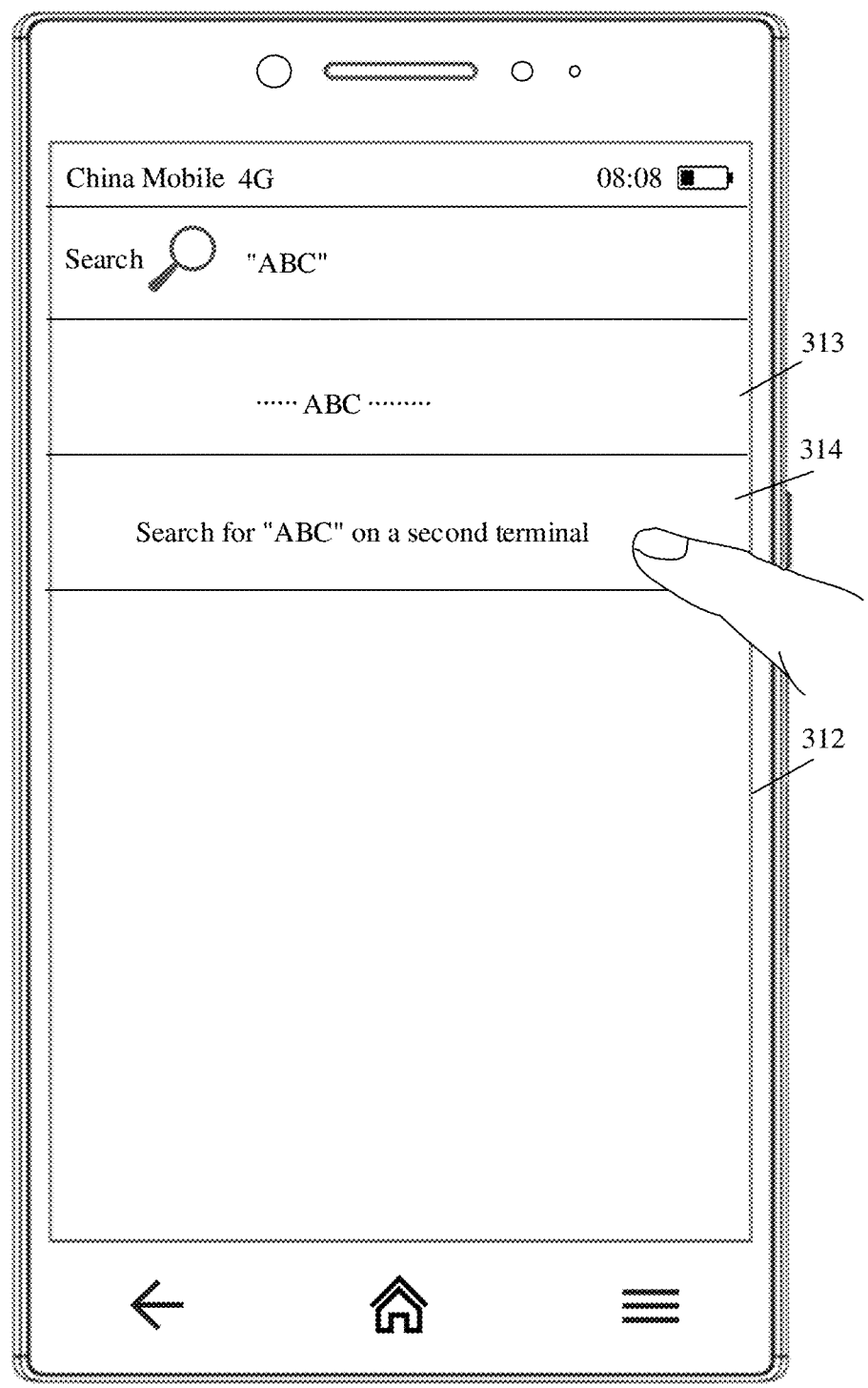
FIG. 3(g) is a schematic diagram of a graphical interface in which an information search method is performed according to an embodiment of the present invention.
Figure 3H:
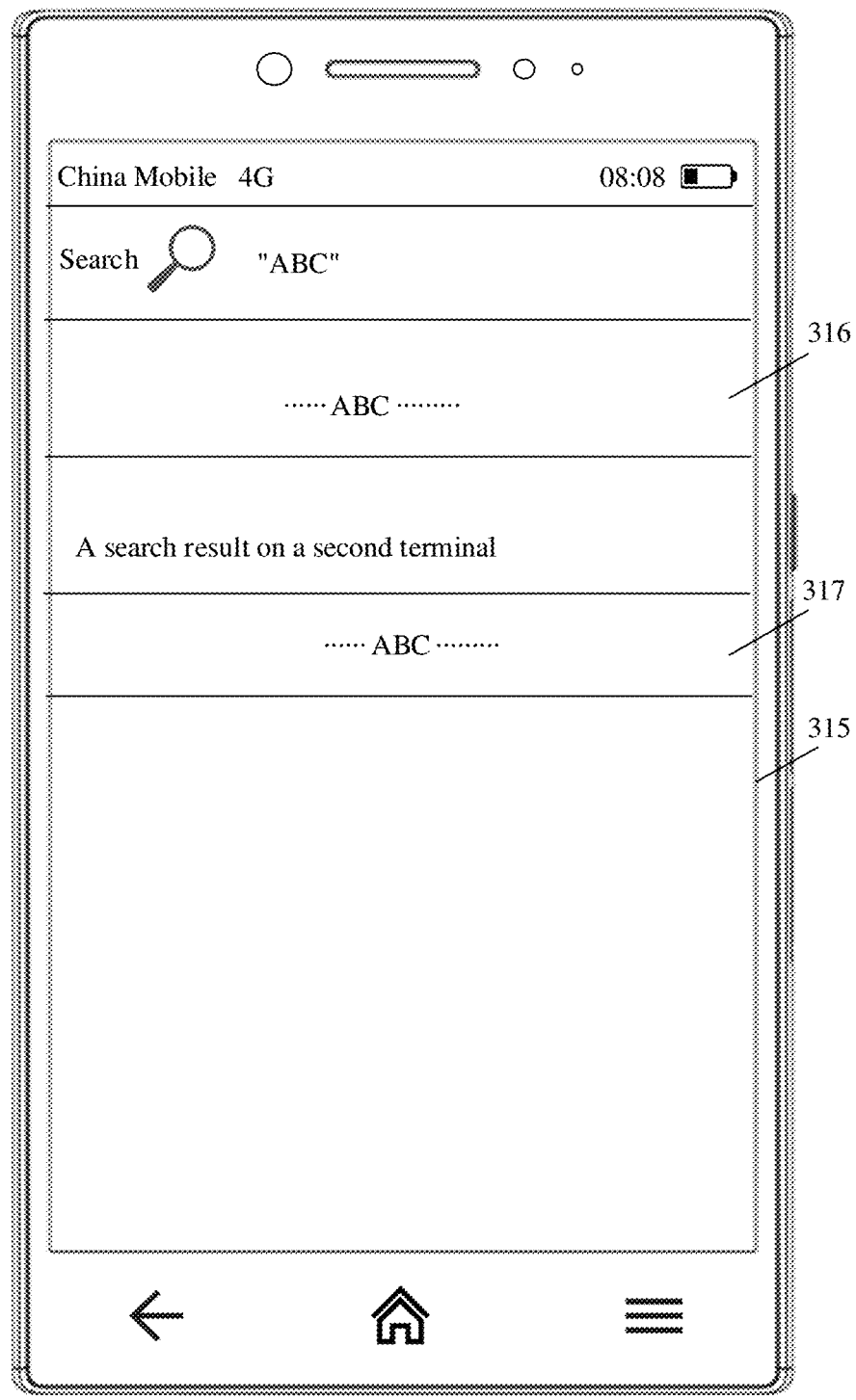
FIG. 3(h) is a schematic diagram of a graphical interface displaying a first search result and a second search result according to an embodiment of the present invention.

According to the foregoing embodiment, as shown in FIG. 3(f), the user taps the search box 307, the terminal presents an interface 309, and the interface 309 includes a search box 310. The user of the first terminal enters a first keyword 311 in the search box 310 to perform a search. Further, when a corresponding search record is obtained by searching for a first keyword 311 (e.g. "ABC"), as shown in FIG. 3(g), the terminal presents an interface 312. The interface 312 includes an obtained search result 313 and an option 314 for further performing a search on the second terminal. When the user of the first terminal taps the option 314, as shown in FIG. 3(h), the first terminal presents an interface 315, and the interface 315 includes a result 316 found locally on the first terminal and a result 317 obtained through the search performed on the second terminal.

Figure 3I:
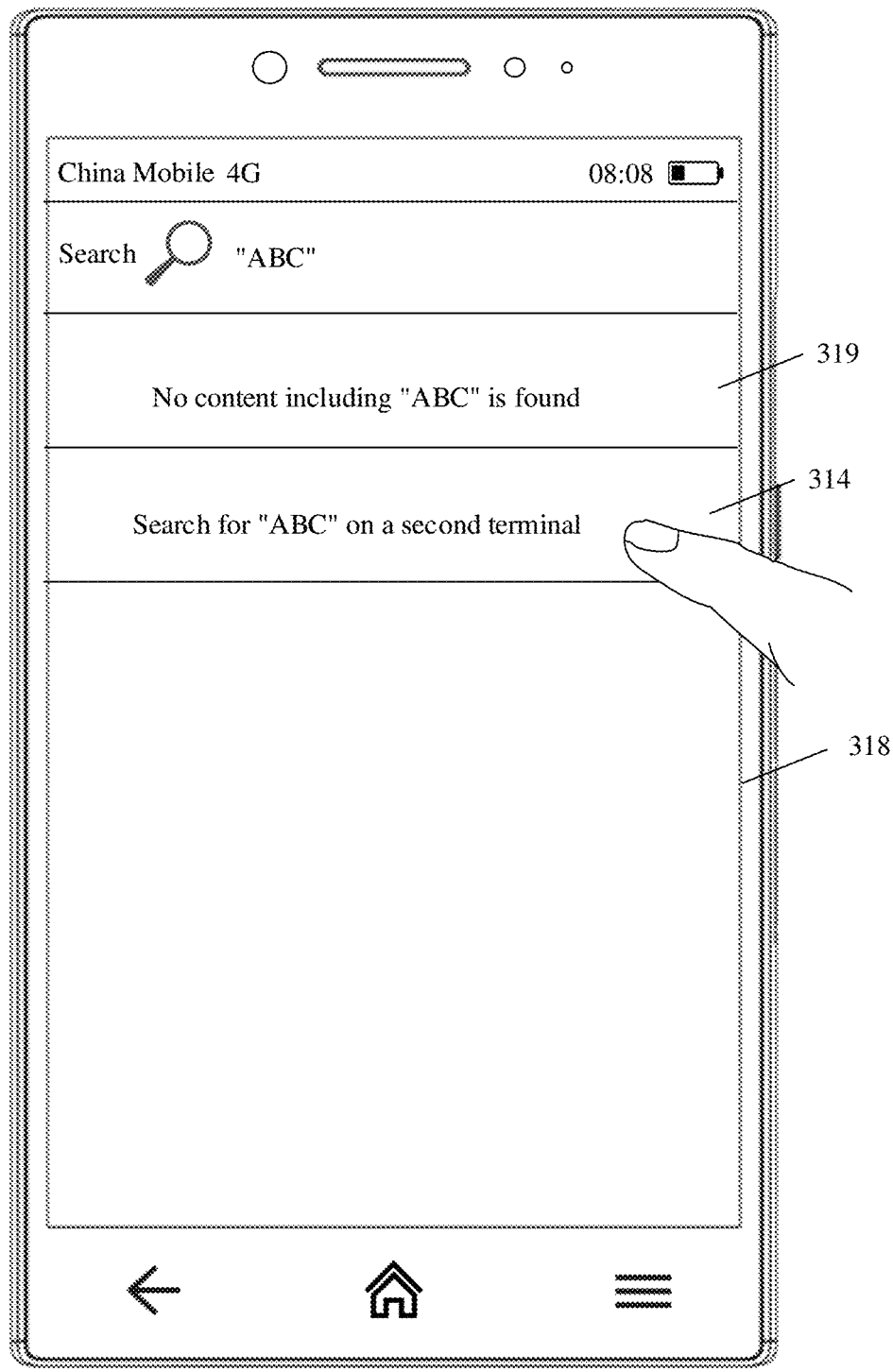
FIG. 3(i) is a schematic diagram of a graphical interface in which no result is found after a first search and in which a first option is displayed according to an embodiment of the present invention.
Figure 3J:
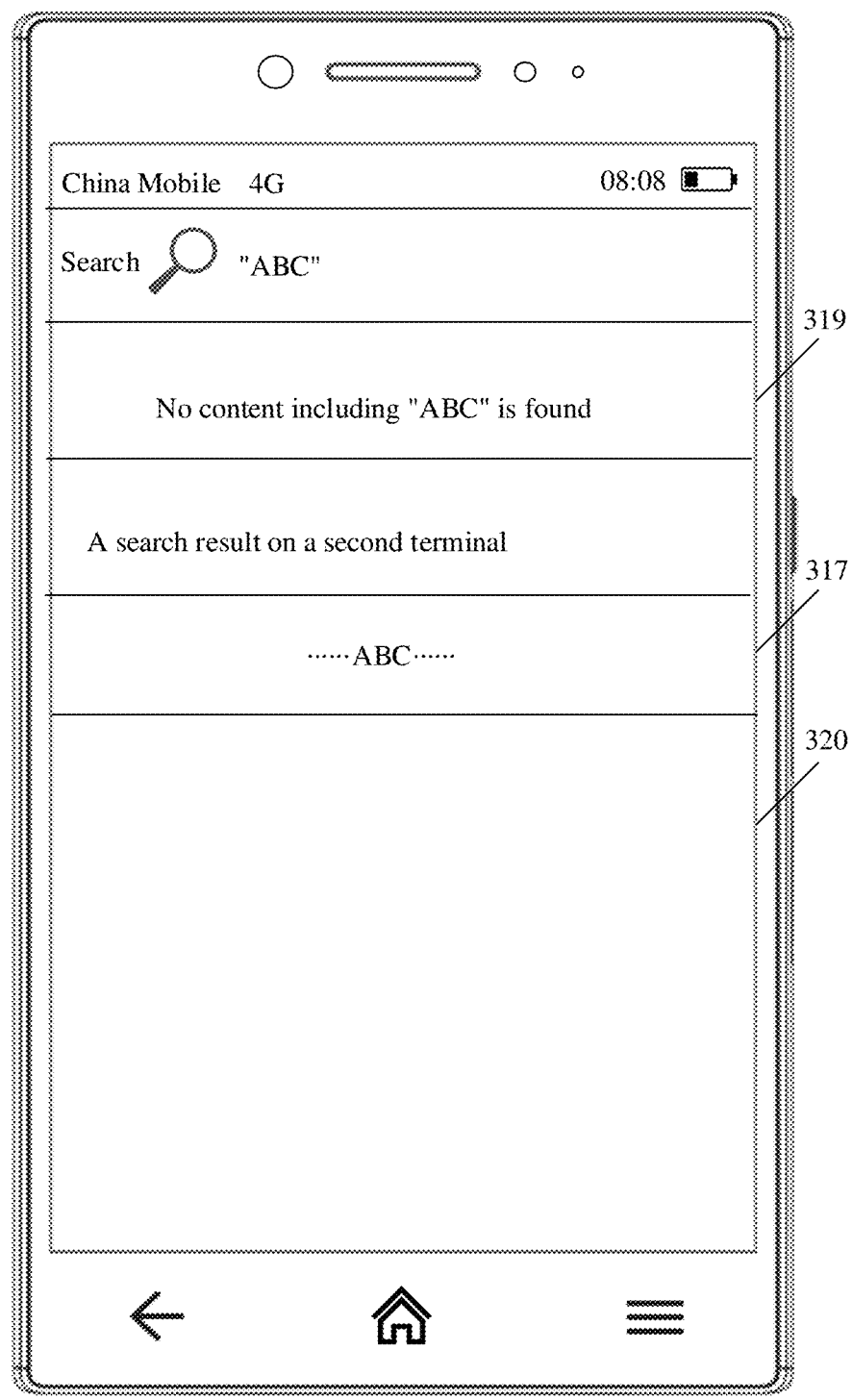
FIG. 3(j) is a schematic diagram of a graphical interface in which no result is found after a first search and a second search result is displayed according to an embodiment of the present invention.

Further, when the corresponding search record is not obtained by searching for the first keyword 311 (e.g. "ABC"), as shown in FIG. 3(i), the terminal presents an interface 318. The interface 318 includes a prompt 319 indicating that no search result is obtained and the option 314 for further performing a search on the second terminal. When the user of the first terminal taps the option 314, as shown in FIG. 3(j), the first terminal presents an interface 320, and the interface 320 includes the prompt 319 indicating that no search result is obtained and the result 317 obtained through the search performed on the second terminal.

Optionally, in some embodiments, in order to request that the second search be performed, the first terminal may also be required to enable the remote search function.

In step S306, verifying the validity of the authorization information and whether the authorization information sent by the network device is valid may be implemented by using a verification mechanism. The verification mechanism is a process in which the second terminal verifies the authorization information, and may be implemented by using a digital certificate mechanism. To be specific, the network device sends a digital certificate including authentication information (for example, the request of the first terminal is authorized by the network device) to the second terminal. The second terminal authenticates validity of the digital certificate by using a public key that is of the network device and that is in the digital certificate. To be specific, the second terminal determines that the authorization information is from the network device, and that the content of the authorization information is not tampered with.

Further, in this embodiment of the present invention, the second terminal searches for corresponding historical information in a local session record based on the first keyword. When a second record of the second terminal is lost, the search fails, and content sent to the network device is empty.

Further, in this embodiment of the present invention, the second terminal has an option for allowing a remote search. When the user of the second terminal opens and/or otherwise selects the option, it is considered that the user of the second terminal allows the remote search. This information is synchronized to the network device, and thereby the network device has the first indication information indicating whether the second terminal has enabled remote search.

Optionally, in some embodiments, if the first terminal initiates the request for performing the second search, and the second terminal does not enable the remote search function, the second terminal queries the user as to whether to enable the remote search function.

Optionally, in some embodiments, the user of the second terminal may enable, on the second terminal, the remote search function for only some social friends. Specifically, for example, the user of the second terminal has three friends: "A", "B", and "C". However, the user of the second terminal enables the remote search function only for "A". Therefore, only a first terminal of the user "A" can cause the second terminal to perform the second search and provide the second search result, and search requests of another user "B" and "C" for the second search to be performed are rejected.

Optionally, in some embodiments, each time the second terminal receives the request for performing the second search, the second terminal requests permission from its user. Specifically, the second terminal has an option that specifies whether authentication needs to be performed each time a remote search is performed. When the user selects the option, each time the first terminal initiates, to the second terminal, the request for performing the second search, the second terminal requests its user for permission.

Optionally, in some embodiments, when the second search result is received, the first terminal may send gratitude information to the second terminal, and thereby the user of the first terminal may express gratitude to the user of the second terminal. Specifically, when presenting the second search, the first terminal simultaneously presents a like button. When the user of the first terminal taps the like button, the corresponding gratitude information is transmitted from the first terminal and the user of the second terminal receives the corresponding gratitude information.

Optionally, in some embodiments, the second terminal directly sends, to the first terminal without sending via the network device, the second search result obtained from the second search performed by the second terminal, in order to reduce the load of the network device.

Figure 3K:
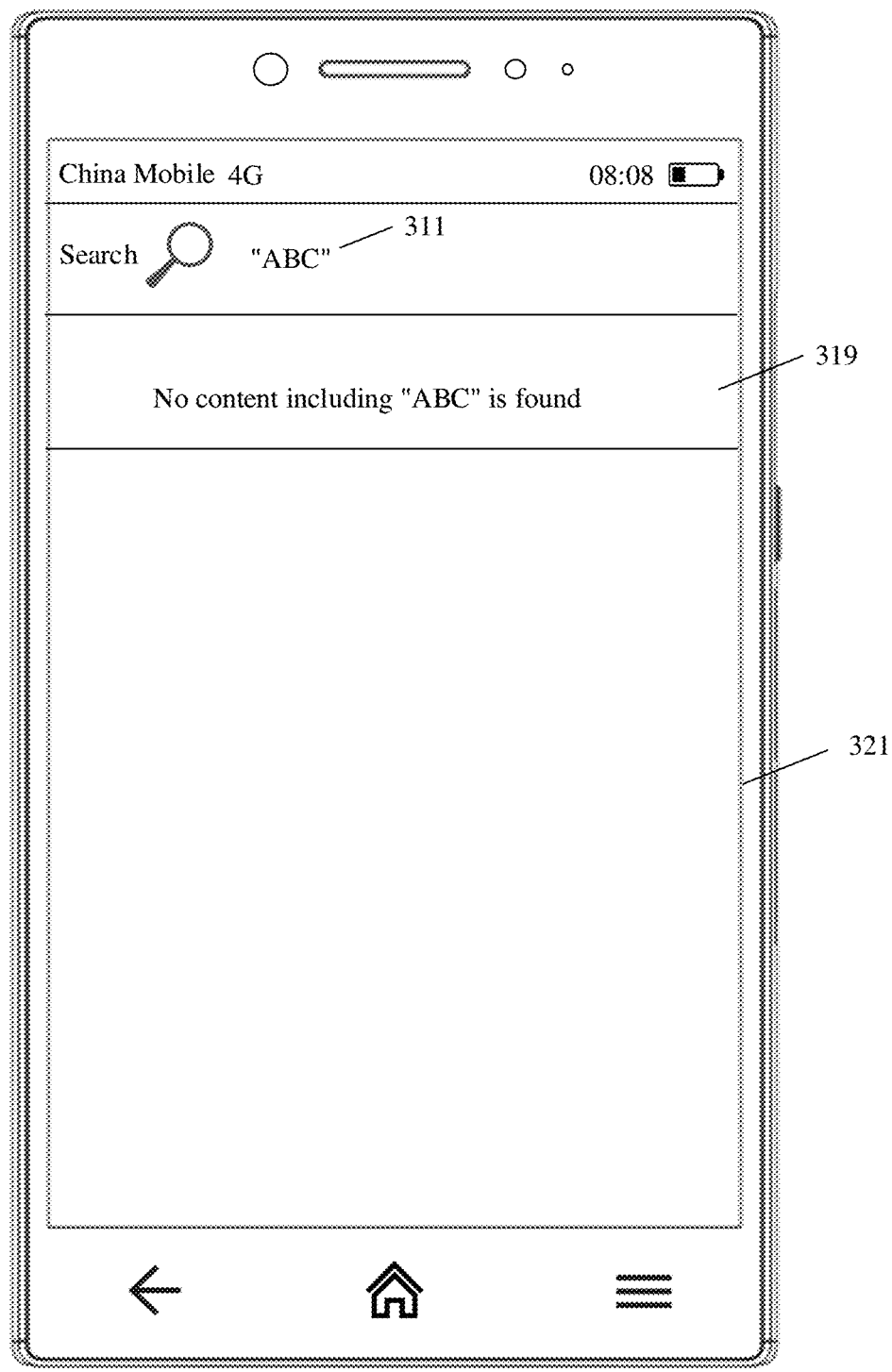
FIG. 3(k) is a schematic diagram of a graphical interface in which no result is found after a first search and in which there is no first option according to an embodiment of the present invention.

Specifically, as shown in FIG. 3(k), the first terminal performs the first search, and presents an interface 321. The interface 321 includes the first keyword 311 and the prompt 319 indicating that no search result is obtained from the first search on the first terminal. Further, the first terminal sends the request for performing the second search. The first terminal displays the executed first search result and the second search result obtained from the second search performed by the second terminal, as shown in FIG. 3(j).

Figure 4A:
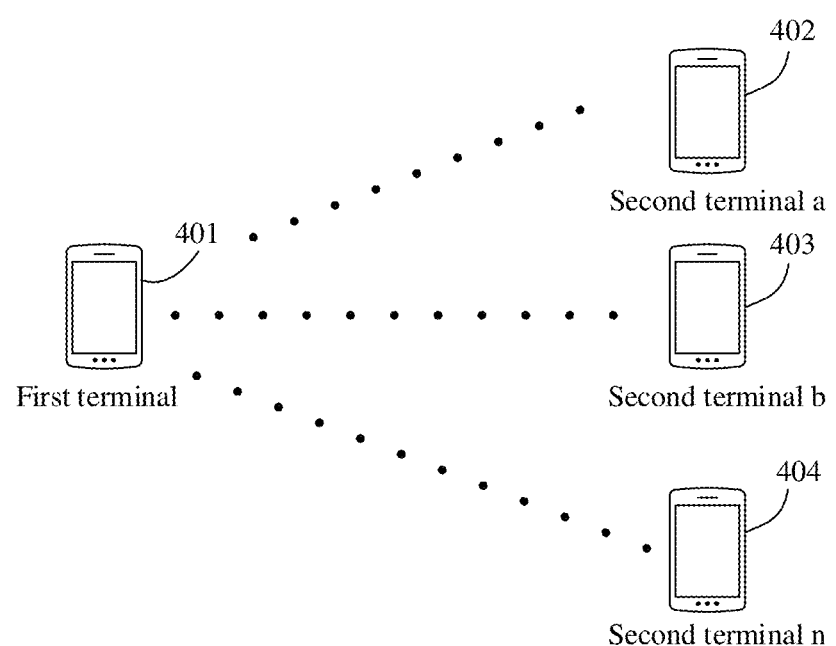
FIG. 4(a) is a schematic diagram of a group session scenario according to an embodiment of the present invention.
Figures 1, 4B:
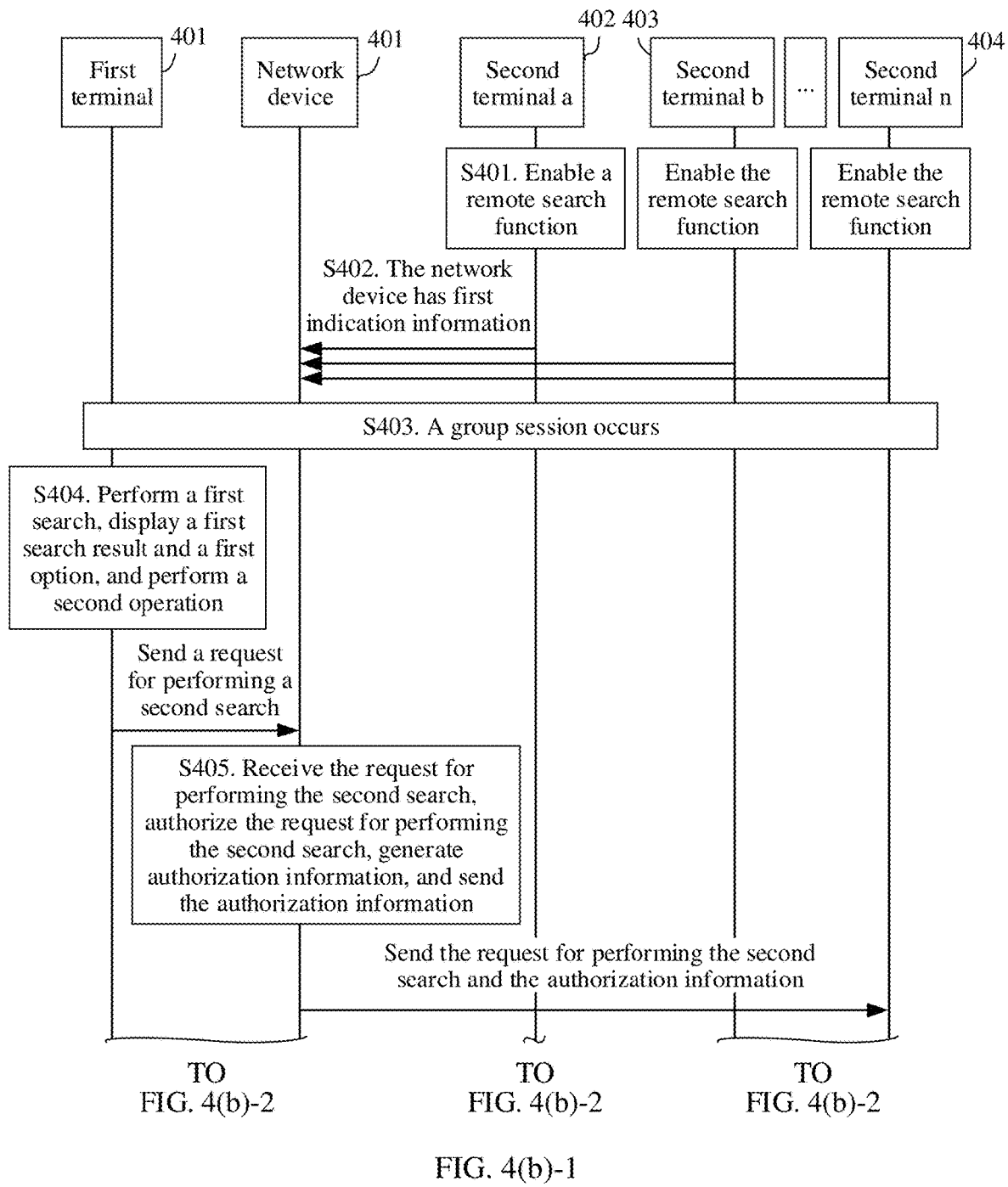
Figures 2, 4B:
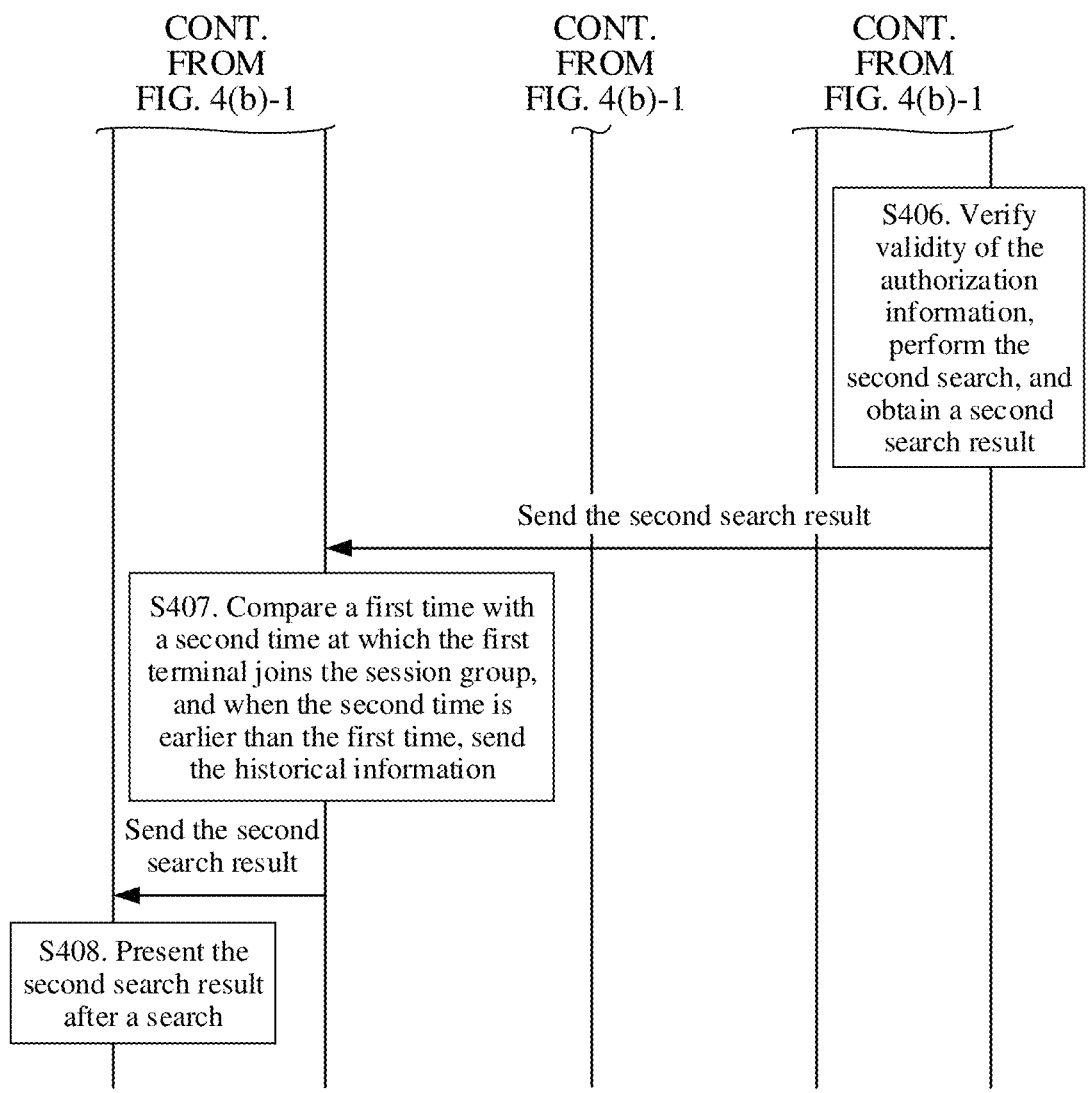

As shown in FIG. 4(a), FIG. 4(b)-1, and FIG. 4(b)-2, an embodiment of the present invention provides an embodiment applied to a group session scenario. As shown in FIG. 4(a), the group session scenario includes a first terminal 401, and a second terminal a 402, a second terminal b 403, and a second terminal n 404 that are in a same group as the first terminal 401.

A specific method according to an example embodiment includes the following steps:

S401. The second terminal in the group enables a remote search function.

S402. A network device receives first indication information from the second terminal indicating that the second terminal enables the remote search function.

S403. A session occurs in the group.

S404. The first terminal performs a first search, displays a first search result obtained from the first search and a first option, performs a second operation, and initiates a request for performing the second search.

S405. The network device receives the request for performing the second search, authorizes the request for performing the second search, generates authorization information, and sends the authorization information and the request to the second terminal.

S406. The second terminal verifies validity of the authorization information, performs the second search, and obtains a second search result.

S407. Compare a first time with a second time at which the first terminal joins the session group, and when the second time is earlier than the first time, send the historical information to the first terminal. The first time corresponds to the time of a record including the first keyword in the second search result.

S408. The first terminal obtains the second search result, and presents the second search result on the first terminal.

Further, in step S401, the second terminal that enables the remote search function may be any terminal in the group. In a remote search process, a historical information search is performed only on the terminal that enables the function.

In some embodiments, the second terminal in the group and the first terminal may not be friends as identified by the application providing for the session. In some embodiments, the second terminal and the first terminal in the group are friends.

Optionally, if in a same group and the request for performing the second search is sent to a non-friend, to obtain information, a friend verification request may be first made.

Optionally, in some embodiments, the session group has a remote search option. An owner or an administrator of the session group enables the remote search function, and all terminals in the group are enabled to search for historical information across terminals.

Figure 4C:
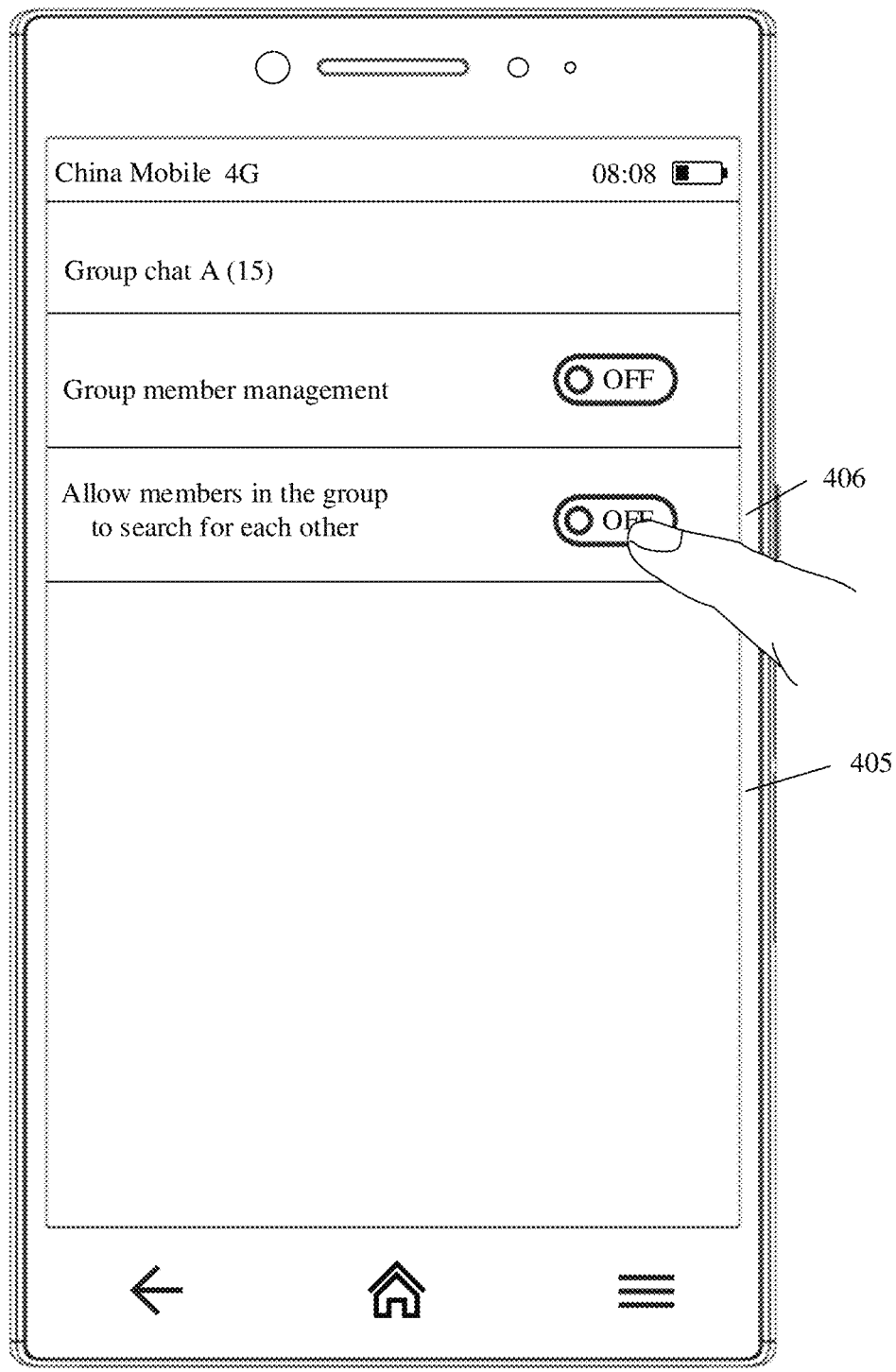
FIG. 4(c) is a schematic diagram of a graphical interface in which a group remote search function is enabled according to an embodiment of the present invention.

Specifically, as shown in FIG. 4(c), the terminal presents an interface 405. The interface 405 is a management interface of the owner or the administrator of the session group, and includes an option 406. The option 406 is used to enable a function of allowing a member in the group to perform a remote search.

Optionally, in some embodiments, the session group may be an instant messaging software group such as a short message group, a WeChat group, or a QQ group.

Further, in step S406, that the network device sends the second search result to the first terminal includes: The network device compares the first time with the second time at which the first terminal joins the session group. The first time is a time at which a third record including the second search result occurs. When the second time is earlier than the first time, the network device sends the second search result to the first terminal.

Specifically, in step S407, a user of the first terminal joins the session group at a moment 14:50. If a group session record at a moment 14:40 is searched for, a cross-terminal search request fails.

Optionally, in some embodiments, the request for performing a remote search is first sent to the second terminal that is in a social-friend relationship with the first terminal in the session group, to search for historical information across terminals. If no result is obtained, the request is sent to another second terminal. For example, there are second terminals "A", "B", and "C" in the session group, and only the second terminal "A" is in a friend relationship with the first terminal. When the first terminal initiates the request for performing the second search and performs a cross-terminal search, the search first starts from the second terminal "A". If corresponding historical information is found on "A", the historical information is directly returned. If the corresponding historical information is not found on "A", the search is performed on other second terminals "B" and "C" at the same time.

Optionally, in some embodiments, the first terminal initiates the request for performing the second search, and all second terminals in the group session that enable the remote search function simultaneously perform the second search locally. When one of the second terminals finds the corresponding historical information and returns the corresponding historical information, the other second terminals stop searching. For example, there are second terminals "A", "B", and "C" in the session group. When the first terminal initiates the request for performing the second search and performs a cross-terminal search, the search is simultaneously performed on the second terminals "A", "B", and "C". If corresponding historical information is found on "A" and is returned, the second terminals "B" and "C" stop searching.

Figure 4D:
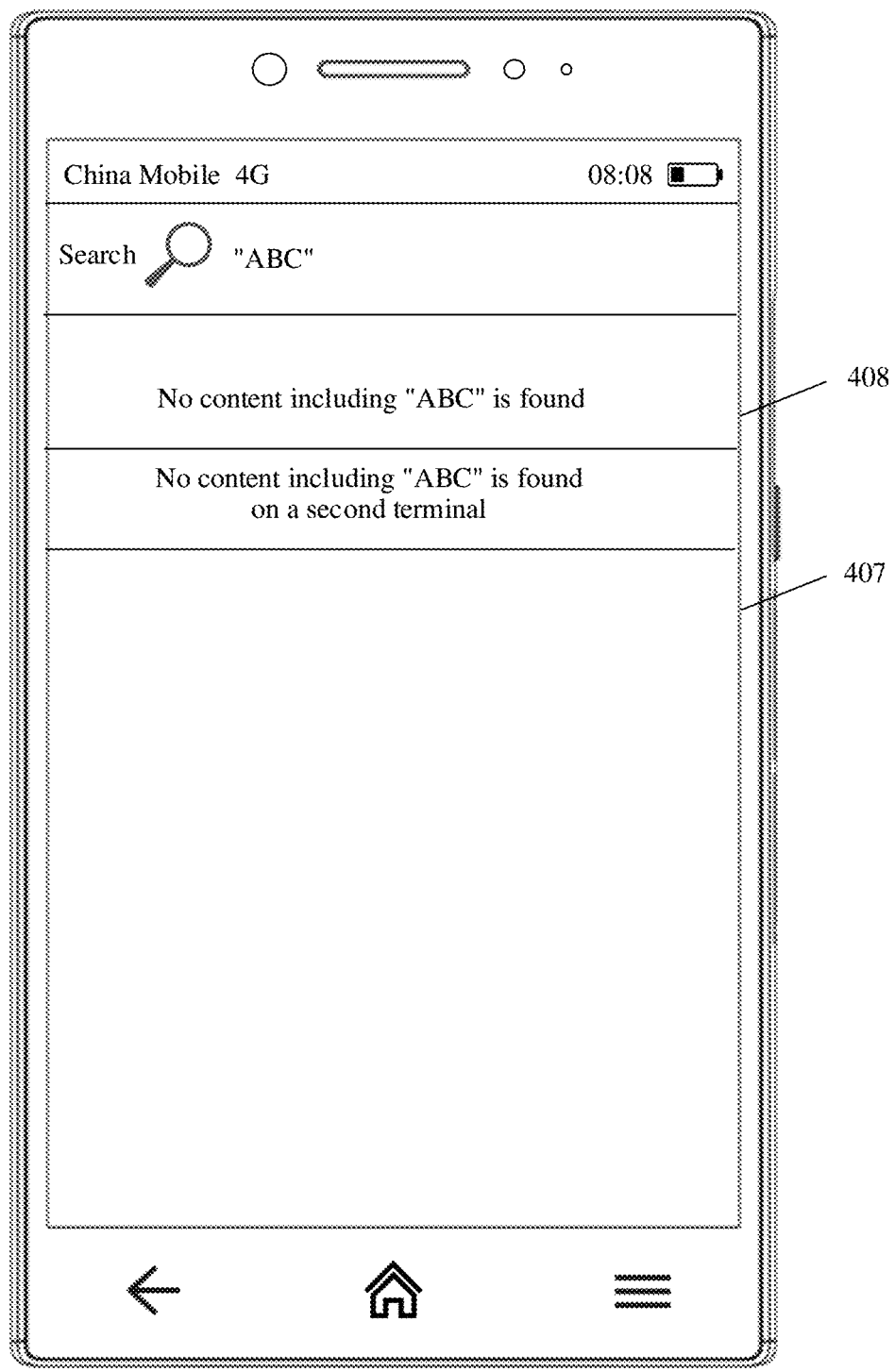
FIG. 4(d) is a schematic diagram of a graphical interface in which no result is found after a first search and a second search according to an embodiment of the present invention.

Specifically, in some embodiments, the first terminal initiates the request for performing the second search. When no second terminal responds to the request or no result including a first keyword is found after the second search is performed, the first terminal prompts that no corresponding search result is found, or content displayed on the first terminal is empty. Specifically, as shown in FIG. 4(d), the first terminal presents an interface 407. The interface 407 includes a prompt box 408, and the prompt box 408 is used to prompt that no search result including the first keyword is found neither on the first terminal nor on the second terminal.

Figure 5:
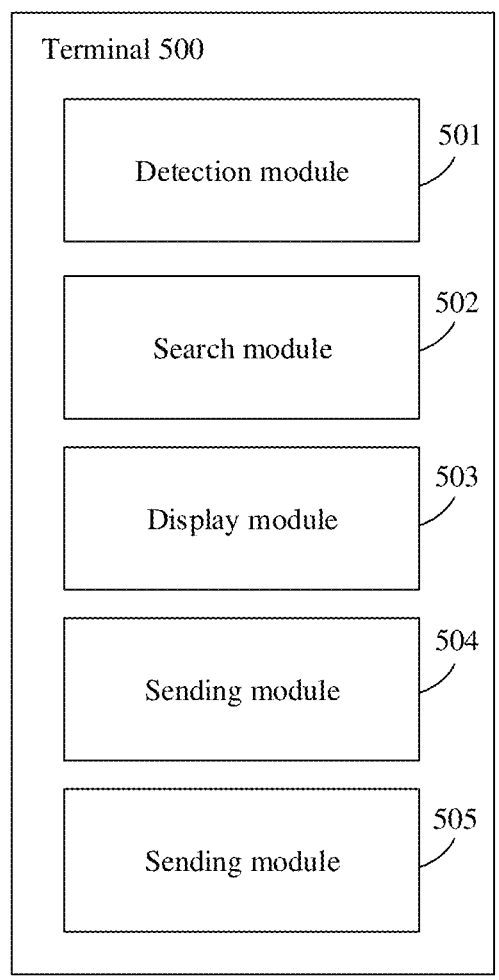
FIG. 5 is a schematic diagram of a terminal apparatus according to an embodiment of the present invention.

As shown in FIG. 5, the present invention provides a terminal 500, including a detection module 501, a search module 502, a display module 503, a sending module 504, and a receiving module 505. The detection module 501 is configured to detect a first operation. The search module 502 is configured to perform a first search in response to the first operation, and the first search is a search for a first keyword in a first record. The first record is stored on the first terminal, and the first record is a record of a session in which a first user that logs on the first terminal and a second user that logs on a second terminal participate. The first user is different from the second user. The display module 503 is configured to display a first search result obtained after the first search is performed and a first option. The first option is used to prompt to perform a second search, and the second search is a search for the first keyword in a second record. The second record is a record that is of the session and that is stored on the second terminal. The sending module 504 is configured to send a request for performing the second search. The receiving module 505 is configured to receive a second search result obtained after the second search is performed.

Further, in some embodiments, the detection module 501 is further configured to detect a second operation performed on the option.

Further, in some embodiments, the display module 503 is further configured to display the second search result obtained after the second search is performed.

Optionally, in some embodiments, the display module 503 is further configured to display indication information. The indication information is used to indicate that the second terminal enables a remote search function, and the remote search function allows the first terminal to send, to the second terminal, the request for performing the second search.

Figure 6:
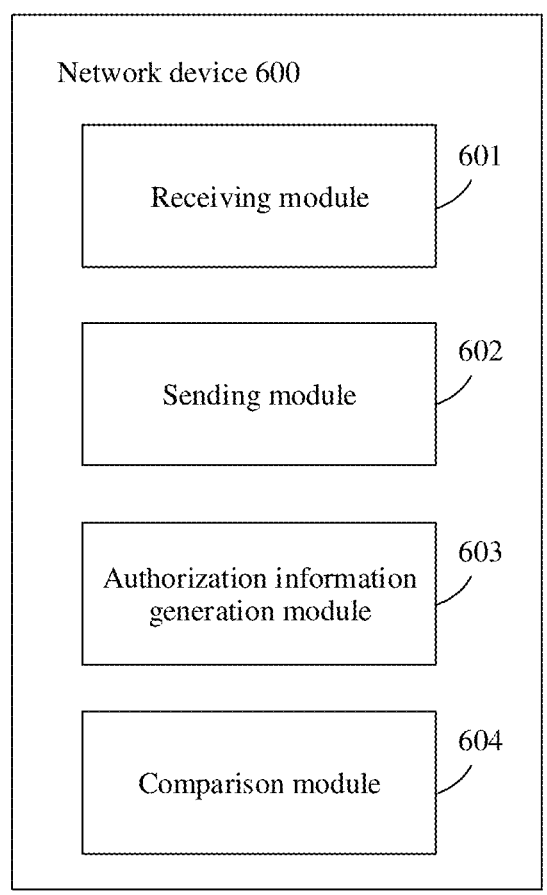
FIG. 6 is a schematic diagram of a network device apparatus according to an embodiment of the present invention.

As shown in FIG. 6, some embodiments of the present invention provide a network device 600, including a receiving module 601, a sending module 602, an authorization information module 603, and a comparison module 604.

The receiving module 601 is configured to receive a request that is sent by a first terminal and that is for performing a second search. The network device has first indication information, and the first indication information is used to indicate that a second terminal enables a remote search function.

The sending module 602 is configured to send, to the second terminal, the request for performing the second search. There is a session between the first terminal and the second terminal, and the session record is historical information of the session.

The authorization information generation module 603 is configured to authorize the request for performing the second search, to generate authorization information.

The comparison module 604 is configured to compare a first time with a second time at which the first terminal joins the session group, and the first time is a time at which the second terminal receives or sends the historical information.

Further, in some embodiments, the receiving module 601 is further configured to receive the historical information sent by the second terminal. The sending module 602 is further configured to send the historical information to the first terminal.

Further, in some embodiments, the sending module is further configured to send the request for performing the second search and the authorization information to the second terminal.

Further, in some embodiments, the second terminal includes a single terminal that has a session with the first terminal.

Further, in some embodiments, the second terminal includes one or more terminals in a same session group as the first terminal.

Further, in some embodiments, the sending module is further configured to send, to the second terminal when the second time is earlier than the first time, the request for performing the second search.

An embodiment of the present invention further provides a computer storage medium, configured to store computer software instructions used to implement methods and apparatus described above in relation to the figures. The computer software instructions include program code designed for performing the method embodiments.

An embodiment of the present invention further provides a computer program product. The computer program product includes computer software instructions, and the computer software instructions may be loaded by using a processor, to implement the method in the foregoing method embodiments.

Although the present invention is described with reference to certain embodiments, a person skilled in the art may understand and implement another variation of the described embodiments by viewing the accompanying drawings, disclosed content, and the appended claims. In the claims, "comprising" (comprising) does not exclude another component or another step, and "a" or "one" does not exclude a case of a plurality. A single processor or another unit may implement several functions listed in the claims. Some measures are described in dependent claims that are different from each other, but this does not mean that these measures cannot be combined to produce a better effect.

The present invention is described with reference to the flowcharts and/or block diagrams of the method, the apparatus (device), and the computer program product according to example embodiments. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a special-purpose computer, an embedded processor, or a processor of another programmable data processing device to generate a machine, so that the instructions executed by using a computer or a processor of another programmable data processing device generate an apparatus for implementing a specified function in one or more processes in the flowcharts and/or in one or more blocks in the block diagrams.

The computer program instructions may alternatively be stored in a computer readable memory that can instruct a computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or another programmable device provide steps for implementing a specified function in one or more processes in the flowcharts and/or in one or more blocks in the block diagrams.

A person skilled in the art should be aware that in the foregoing one or more examples, the functions described in the example embodiments may be implemented by using hardware, software, firmware, or any combination thereof. When the functions are implemented by software, the functions may be stored in a computer readable medium or transmitted as one or more instructions or code in a computer readable medium. The computer readable medium includes a computer storage medium. The storage medium may be any available medium accessible to a general-purpose computer or a special-purpose computer.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A search method, wherein the method comprises:
   detecting, by a first terminal, a first operation;
   performing on the first terminal a first search in response to the first operation, wherein the first search is a search for a first keyword in a first record, the first record is stored on the first terminal, the first record is a record of a session in which a first user that logs on the first terminal and a second user that logs on a second terminal participate, and the first user is different from the second user;
   displaying, by the first terminal, a first search result obtained from the first search and a first option, wherein the first option is used to prompt to perform a second search on the second terminal, the second search is a search for the first keyword in a second record, and the second record is a record that is of the session and that is stored on the second terminal, wherein the second terminal is one of a plurality of terminals listed in a display screen on the first terminal, and at least the second terminal in the listed plurality of terminals is indicated as enabled for a remote search function and at least one other terminal in the listed plurality of terminals is not indicated as enabled for the remote search function, and wherein the remote search function enables the search for the first keyword in the second record;

detecting, by the first terminal, a second operation performed on the first option;

sending, by the first terminal in response to the second operation, a request for performing the second search;

receiving, by a network device, the request, wherein the network device has first indication information indicating that the second terminal enables a remote search function, and the remote search function enables the search for the first keyword in the second record;

forwarding, by the network device, the request to the second terminal;

receiving, by the network device, a second search result that is sent by the second terminal and that is obtained from the second search performed on the second terminal;

sending, by the network device, the second search result to the first terminal; and displaying, by the first terminal, the second search result.

2. The method according to claim 1, wherein the forwarding, by the network device, the request to the second terminal comprises:

authorizing, by the network device, the request to generate authorization information; and sending, by the network device, the request and the authorization information to the second terminal.

3. The method according to claim 1, wherein the second search result comprises:

the second search result and a context of the second search result.

4. The method according to claim 1, wherein the request for performing the second search comprises:

a first identifier, wherein the first identifier is an identity of the first terminal;

a second identifier, wherein the second identifier is an identity of the second terminal; and the first keyword.

5. The method according to claim 1, wherein the second terminal comprises:

a single terminal that has a session with the first terminal, one terminal in a same session group as the first terminal, or a plurality of terminals in a same session group as the first terminal.

6. The method according to claim 1, wherein the first operation or the second operation comprises at least one of the following options:

tapping a touchscreen of a terminal, double tapping the touchscreen of the terminal, or sliding on the touchscreen of the terminal and receiving voice input.

7. The method according to claim 1, wherein the first search result or the second search result comprises at least one of the following options:

text information, a link, an image, or a video.

8. A system comprises:
a first terminal;
a network device; and
a second terminal;
wherein the first terminal is configured to:
detect a first operation;
perform a first search in response to the first operation, wherein the first search is a search for a first keyword in a first record, the first record is stored on the first terminal, the first record is a record of a session in which a first user that logs on the first terminal and a second user that logs on the second terminal participate, and the first user is different from the second user;

display a first search result obtained from the first search performed on the first terminal and a first option, wherein the first option is used to prompt to perform a second search on the second terminal, the second search is a search for the first keyword in a second record, and the second record is a record that is of the session and that is stored on the second terminal, wherein the second terminal is one of a plurality of terminals listed in a display screen on the first terminal, and at least the second terminal in the listed plurality of terminals is indicated as enabled for a remote search function and at least one other terminal in the listed plurality of terminals is not indicated as enabled for the remote search function, and wherein the remote search function enables the search for the first keyword in the second record;

detect a second operation performed on the first option; and send a request for performing the second search to the network device in response to the second operation;

wherein the network device is configured to:
receive the request, wherein the network device has first indication information, the first indication information is used to indicate that the second terminal enables a remote search function, and the remote search function enables the search for the first keyword in the second record;

forward the request to the second terminal;

receive a second search result that is sent by the second terminal and that is obtained from the second search performed on the second terminal; and send the second search result to the first terminal;

wherein the first terminal is further configured to display the second search result.

9. The system according to claim 8, wherein the second search result comprises:

the second search result and a context of the second search result.

10. The system according to claim 8, wherein the request for performing the second search comprises:

a first identifier, wherein the first identifier is an identity of the first terminal;

a second identifier, wherein the second identifier is an identity of the second terminal; and the first keyword.

11. The system according to claim 8, wherein the second terminal comprises:

a single terminal that has a session with the first terminal, one terminal in a same session group as the first terminal, or a plurality of terminals in a same session group as the first terminal.

12. The system according to claim 8, wherein the first operation or the second operation comprises at least one of the following:

tapping a touchscreen of a terminal, double tapping the touchscreen of the terminal, or sliding on the touchscreen of the terminal and receiving voice input.

13. The system according to claim 8, wherein the first search result or the second search result comprises at least one of the following options:

text information, a link, an image, or a video.

* * * * *